(12) United States Patent
Gaudin et al.

(10) Patent No.: US 12,450,667 B2
(45) Date of Patent: Oct. 21, 2025

(54) AUTOMATICALLY TRACKING DRIVING ACTIVITY

(71) Applicant: State Farm Mutual Automobile Insurance Company, Bloomington, IL (US)

(72) Inventors: Kristopher Keith Gaudin, Bloomington, IL (US); Andrew J. Zeglin, Normal, IL (US); Craig Benjamin Cope, Bloomington, IL (US); Joseph Harr, Bloomington, IL (US); Aaron Williams, Congerville, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/774,510

(22) Filed: Jul. 16, 2024

(65) Prior Publication Data

US 2024/0371216 A1    Nov. 7, 2024

Related U.S. Application Data

(63) Continuation of application No. 17/092,589, filed on Nov. 9, 2020, now Pat. No. 12,067,819, which is a
(Continued)

(51) Int. Cl.
*G06Q 40/08*    (2012.01)
*G06Q 30/0207*    (2023.01)
*G06Q 30/0251*    (2023.01)

(52) U.S. Cl.
CPC ......... *G06Q 40/08* (2013.01); *G06Q 30/0207* (2013.01); *G06Q 30/0266* (2013.01)

(58) Field of Classification Search
CPC .. B60W 40/09; B60W 50/045; B60W 50/085; B60W 50/12; B60W 50/14;
(Continued)

(56) References Cited

U.S. PATENT DOCUMENTS 6,353,785 B1    3/2002    Shuman
6,405,128 B1    6/2002    Bechtolsheim
(Continued)

FOREIGN PATENT DOCUMENTS

EP    3239686 A1    11/2017
EP    3578433 A1    4/2019
(Continued)

OTHER PUBLICATIONS

Jermakian, et al., "Effects of an integrated collision waring system on teenage driver behavior," Journal of Safety Research, vol. 61, Jun. 2017, p. 65075.
(Continued)

*Primary Examiner* — Justin S Lee
(74) *Attorney, Agent, or Firm* — Lee & Hayes, P.C.

(57) ABSTRACT

A system and computer-implemented method detect and act upon deactivated vehicle components. The system and method include receiving measurements data associated with driving activity. The measurements data includes an indication that at least one feature of an Advanced Driver Assistance System (ADAS) of a vehicle has been deactivated for a driving activity. The system and method may include receiving historical driving data including a history of at least one driving activity aided by activation of the alert from the ADAS feature. The system and method may compare the measurements data to the historical driving data, determine a likelihood level that the feature of the ADAS would have provided the alert had the feature been activated based upon the comparing, and set, based at least
(Continued)

upon the determining, at least a portion of an operator profile associated with an operator of the vehicle with the likelihood level.

20 Claims, 7 Drawing Sheets

Related U.S. Application Data continuation of application No. 16/053,881, filed on Aug. 3, 2018, now Pat. No. 10,960,895.

(60) Provisional application No. 62/563,729, filed on Sep. 27, 2017, provisional application No. 62/563,722, filed on Sep. 27, 2017, provisional application No. 62/563,808, filed on Sep. 27, 2017, provisional application No. 62/563,818, filed on Sep. 27, 2017.

(58) Field of Classification Search
CPC . B60W 2040/0818; B60W 2050/0063; B60W 2050/046; B60W 2050/143; G06Q 30/0207; G06Q 40/08; G07C 5/008; G07C 5/0816
See application file for complete search history.

(56) References Cited

U.S. PATENT DOCUMENTS

| | | | |
|---|---|---|---|
| 9,493,071 | B2 | 11/2016 | Lindhuber |
| 9,830,748 | B2 | 11/2017 | Rosenbaum |
| 9,892,573 | B1 | 2/2018 | Hsu-Hoffman |
| 9,925,987 | B1 | 3/2018 | Nguyen |
| 9,990,782 | B2 | 6/2018 | Rosenbaum |
| 10,269,190 | B2 | 4/2019 | Rosenbaum |
| 10,467,824 | B2 | 11/2019 | Rosenbaum |
| 10,755,356 | B1 | 8/2020 | Labarre et al. |
| 11,227,452 | B2 | 1/2022 | Rosenbaum |
| 11,407,410 | B2 | 8/2022 | Rosenbaum |
| 11,524,707 | B2 | 12/2022 | Rosenbaum |
| 11,594,083 | B1 | 2/2023 | Rosenbaum |
| 2007/0168915 | A1 | 7/2007 | Fabbio et al. |
| 2008/0243558 | A1 | 10/2008 | Gupte |
| 2009/0210257 | A1 | 8/2009 | Chalfant et al. |
| 2010/0082248 | A1 | 4/2010 | Dorum |
| 2011/0054716 | A1 | 3/2011 | Stählin |
| 2012/0027248 | A1 | 2/2012 | Feris |
| 2013/0110310 | A1 | 5/2013 | Young |
| 2013/0166098 | A1 | 6/2013 | Lavie |
| 2013/0317862 | A1 | 11/2013 | Fernandes |
| 2014/0067206 | A1 | 3/2014 | Pflug |
| 2014/0129080 | A1 | 5/2014 | Leibowitz et al. |
| 2014/0139670 | A1 | 5/2014 | Kesavan |
| 2014/0266655 | A1 | 9/2014 | Palan |
| 2014/0272811 | A1 | 9/2014 | Palan |
| 2015/0006207 | A1 | 1/2015 | Jarvis |
| 2015/0081404 | A1 | 3/2015 | Basir |
| 2015/0166059 | A1 | 6/2015 | Ko |
| 2015/0170253 | A1 | 6/2015 | Kim et al. |
| 2015/0352999 | A1* | 12/2015 | Bando .................. B60W 40/09 340/439 |
| 2016/0114807 | A1* | 4/2016 | Phelan ..................... G08G 1/20 701/70 |
| 2017/0032673 | A1 | 2/2017 | Scofield et al. |
| 2017/0072850 | A1 | 3/2017 | Curtis |
| 2017/0088142 | A1 | 3/2017 | Hunt et al. |
| 2017/0221150 | A1 | 8/2017 | Bichacho |
| 2017/0261990 | A1 | 9/2017 | Lei |
| 2017/0292848 | A1 | 10/2017 | Nepomuceno |
| 2017/0369072 | A1 | 12/2017 | Huber |
| 2017/0369073 | A1 | 12/2017 | Huber |
| 2018/0047107 | A1 | 2/2018 | Perl |
| 2018/0167407 | A1 | 6/2018 | Ikeda |
| 2022/0092893 | A1 | 3/2022 | Rosenbaum |
| 2022/0340148 | A1 | 10/2022 | Rosenbaum |
| 2023/0060300 | A1 | 3/2023 | Rosenbaum |

FOREIGN PATENT DOCUMENTS

| | | |
|---|---|---|
| EP | 3730375 A1 | 4/2020 |
| EP | 3960576 A1 | 3/2022 |
| EP | 4190659 A1 | 6/2023 |
| EP | 4190660 A1 | 6/2023 |
| WO | WO2010062899 A1 | 6/2010 |

OTHER PUBLICATIONS

Navipedia, "GPS Space Segment", available at <<http://https://gssc.esa.int/navipedia/index.php/GPS_Space_Segment#:~:text=The%20main%20functions%20of%20the,clocks%20on%20board%20the%20satellites.>>, 2011, 2 pages.

Office Action for U.S. Appl. No. 17/092,589, mailed on Feb. 26, 2024, Gaudin, "Automatically Tracking Driving Activity", 8 pages.

Van Sickle, "The Satellite Clock: Satellite Clock Drift," GPS and GNSS for Geospatial Professionals, available at <<http://https://www.e-education.psu.edu/geog862/node/1714>>, 2011, 4 pages.

* cited by examiner

AUTOMATICALLY TRACKING DRIVING ACTIVITY

CROSS REFERENCE TO RELATED APPLICATIONS

This present disclosure is a continuation of and claims priority to U.S. patent application Ser. No. 17/092,589, filed on Nov. 9, 2020, which is a continuation of U.S. patent application Ser. No. 16/053,881, entitled "AUTOMATICALLY TRACKING DRIVING ACTIVITY", and filed on Aug. 3, 2018, now known as U.S. Pat. No. 10,960,895, issued on Mar. 30, 2021, which claims the benefit of U.S. Provisional Patent Application No. 62/563,722, entitled "System and Method for Evaluating Driving Behavior" and filed on Sep. 27, 2017; U.S. Provisional Patent Application No. 62/563,729, entitled "Evaluating Operator Reliance on Vehicle Alerts" and filed on Sep. 27, 2017; U.S. Provisional Application No. 62/563,808, entitled "Automatically Tracking Driving Activity" and filed on Sep. 27, 2017; and U.S. Provisional Application No. 62/563,818, entitled "Automated Selection of a Vehicle" filed on Sep. 27, 2017, all of which are incorporated herein in by reference in their entirety.

TECHNICAL FIELD

The present disclosure relates generally to evaluating driving behavior for a particular driving activity. More particularly, the present disclosure relates to detecting and acting upon deactivated vehicle components, such as features of an Advanced Driver Assistance System (ADAS) installed in the driven vehicle.

BACKGROUND

An Advanced Driver Assistance System (ADAS) installed in a vehicle may aid the operator of the vehicle by providing alerts in response to an operator's actions. In general, an ADAS may monitor various traffic conditions and/or the external environment surrounding the vehicle, and may take measurements of objects using radar or camera-based sensors, to assist the operator.

An example of an ADAS is a blind spot monitoring system. A blind spot monitoring system may provide alerts to an operator if a vehicle-based sensor device detects other vehicles located to the operator's side and/or rear, which may aid the operator when changing lanes. Another example of an ADAS is a lane departure warning system. A lane departure warning system may provide alerts to an operator if a vehicle-based sensor device detects that the vehicle is beginning to move out of its lane, which may aid the operator to stay in his or her lane. Other examples of an ADAS may include a forward collision warning system. However, driver reliance on ADAS systems may vary by individual, which may cause one or more drawbacks.

BRIEF SUMMARY

The present embodiments disclose systems and methods that may generally relate to evaluating driving behavior for a particular driving activity, and particularly, inter alia, to detecting and acting upon deactivated vehicle components, such as features of an Advanced Driver Assistance System (ADAS) installed in the driven vehicle.

In one aspect, a computer-implemented method for detecting and acting upon deactivated vehicle components may be provided. The method may include: (1) receiving, by the processor, measurements data associated with driving activity in response to the detecting, where the measurements data includes an indication that at least one feature of an Advanced Driver Assistance System (ADAS) of a vehicle has been deactivated for a driving activity; (2) receiving, by the processor, historical driving data including a history of at least one driving activity aided by activation of the alert from the ADAS feature; (3) comparing, by the processor, the measurements data to the historical driving data; (4) determining, by the processor, a likelihood level that the feature of the ADAS would have provided the alert had the feature been activated based upon the comparing; and/or (5) setting, by the processor, based at least upon the determining, at least a portion of an operator profile associated with an operator of the vehicle with the likelihood level. The method may include additional, less, or alternate actions, including those discussed elsewhere herein.

In another aspect, a computer system for detecting and acting upon deactivated vehicle components may be provided. The system may include one or more processors, transceivers, and memory units storing instructions. When executed by the one or more processors, the instructions may cause the computer system to: (1) receive, by the processor, measurements data associated with the driving activity, where the measurements data includes an indication that at least one feature of an Advanced Driver Assistance System (ADAS) of a vehicle has been deactivated for a driving activity; (2) receive, by the processor, historical driving data including a history of at least one driving activity aided by activation of the alert from the ADAS feature; (3) compare, by the processor, the measurements data to the historical driving data; (4) determine, by the processor, a likelihood level that the feature of the ADAS would have provided the alert had the feature been activated based upon the comparing; and/or (5) set, by the processor, based at least upon the determining, at least a portion of an operator profile associated with an operator of the vehicle with the likelihood level. The computer system may include additional, less, or alternate functionality, including that discussed elsewhere herein.

In another aspect, a non-transitory, computer-readable medium (or media) stores instructions that, when executed by one or more processors, cause the one or more processors to: (1) receive, by the processor, measurements data associated with the driving activity, where the measurements data includes an indication that at least one feature of an Advanced Driver Assistance System (ADAS) of a vehicle has been deactivated for a driving activity; (2) receive, by the processor, historical driving data including a history of at least one driving activity aided by activation of the alert from the ADAS feature; (3) compare, by the processor, the measurements data to the historical driving data; (4) determine, by the processor, a likelihood level that the feature of the ADAS would have provided the alert had the feature been activated based upon the comparing; and/or (5) set, by the processor, based at least upon the determining, at least a portion of an operator profile associated with an operator of the vehicle with the likelihood level. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects.

Accordingly, the drawings and description are to be regarded as illustrative in nature and not as restrictive.

BRIEF DESCRIPTION OF DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
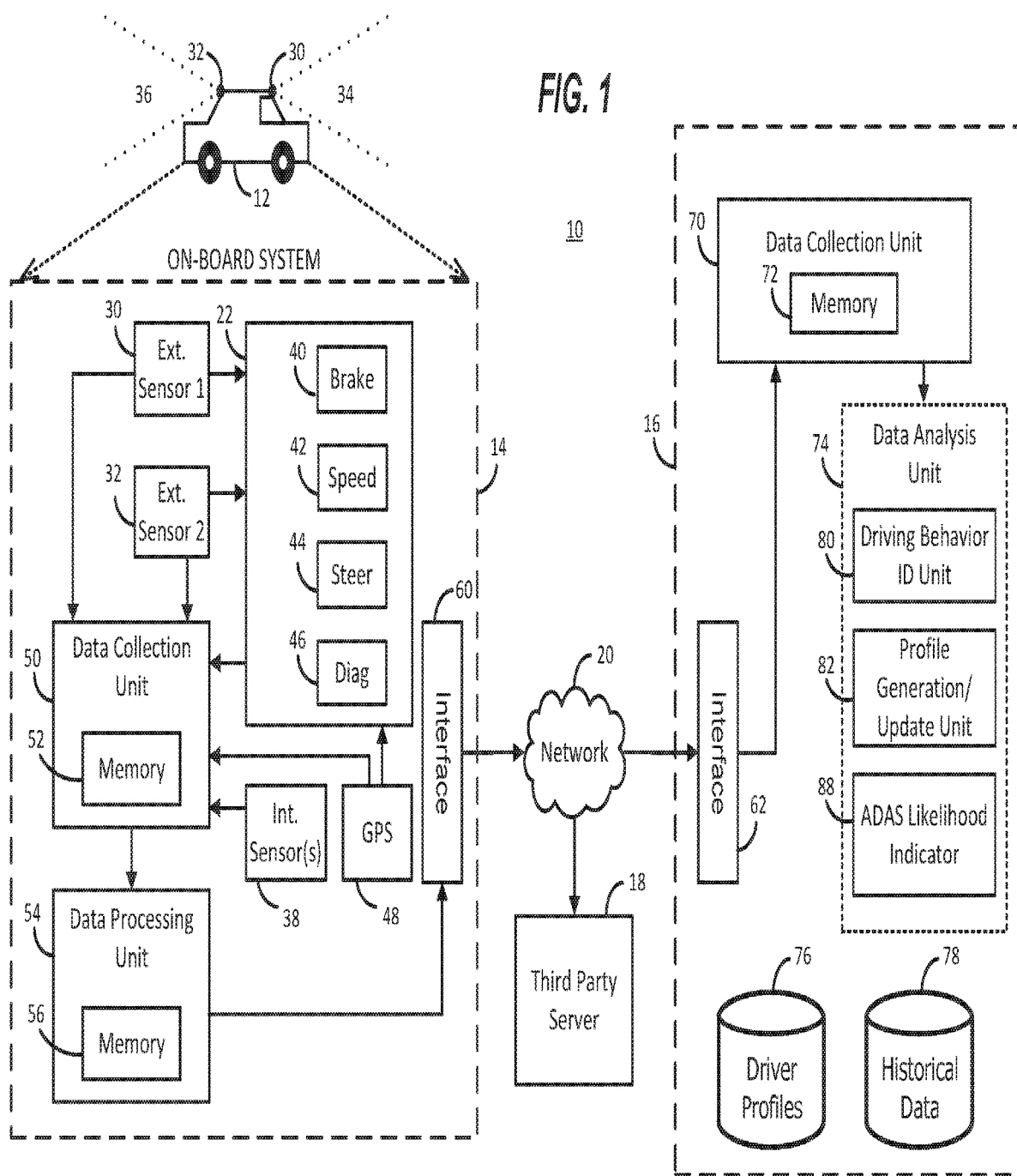
FIG. 1 is a block diagram of an exemplary computer system for identifying driving behavior, and generating, modifying, and/or using driver profiles.

The Figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

The embodiments described herein relate to, inter alia, systems and techniques for identifying driving behavior, and/or generating, modifying, and/or using profiles for drivers/operators of vehicles. The operator profile may be generated and/or modified using vehicle telematics data indicative of how the operator/operator drives the vehicle (e.g., acceleration data, braking data, cornering data, etc.), data indicative of when and/or where the operator/operator drives the vehicle (e.g., GPS data), data indicative of the circumstances in which the operator/operator drives the vehicle (e.g., camera or other sensor data indicating the presence of passengers in the vehicle, the distance between the operator's vehicle and other vehicles, weather, time of day, sunlight or night time, city or rural, geographic information, etc.), and/or other data (e.g., demographic information, dealership information regarding recalls or maintenance, etc.).

As the term is used herein, "vehicle telematics data" may include any suitable type or types of data provided by the vehicle (e.g., one or more sensors and/or subsystems of the vehicle), by a mobile electronic device carried or located within the vehicle (e.g., a smartphone or wearable electronic device of the operator), and/or by any other electronic device or component carried on or within the vehicle. Depending upon the context and the embodiment, for example, vehicle telematics data may include acceleration data generated by an electronic control system of the vehicle and/or by an accelerometer of the operator's mobile electronic device, GPS data provided by a GPS unit of the vehicle and/or a GPS unit of the mobile electronic device, speed and acceleration data, heading and direction data, route information, image or video data generated by a camera of the vehicle and/or a camera of the mobile electronic device, and so on.

In various different embodiments, the operator profiles may be used m different situations or scenarios. For example, the profiles may be used to adjust a price to risk model or insurance ratings (e.g., during initial underwriting, or when renewing a policy, etc.), to rate or showcase a driving instructor or student, to determine whether to provide a discount, and/or for other purposes. In some embodiments, the profile may include a rating that is indicative of the operator's personal responsibility or trustworthiness, and may be used in situations where such qualities are of particular importance. For example, likelihood levels in driver profiles may be used to adjust driver credit ratings (e.g., when applying for a loan or credit line), to determine whether an "IOU" may be accepted from an individual, to determine whether candidates will be offered particular jobs, and so on.

In one embodiment, an ideal responsible driver may be characterized as an operator who does not over-rely on ADAS when driving, but rather, uses ADAS as an aid in appropriate situations. An operator that is over-reliant on ADAS may not be establishing or maintaining his or her general driving behavior, driving proficiency, and/or driving skills. If a particular ADAS overly-relied upon is malfunctioning/inoperable, or if a rental vehicle does not feature the particular ADAS overly-relied upon, the operator may not be prepared to safely drive the vehicle.

Additionally or alternatively, an ideal responsible driver may be characterized as an operator who minimally uses ADAS when driving, as opposed to never using ADAS at all, in appropriate situations. For example, if the operator's natural driving behavior of staying within a lane on a highway needs further training or practice, using a lane departure warning system may be safer than not using one at all, if there are no indications that the lane departure warning system in the vehicle is malfunctioning, inoperable, disabled, or providing erroneous alerts. The present embodiments may measure an operator's response to alerts from an ADAS that may be highly probative of an operator's characteristics or qualities as it relates to risk averse driving behavior, and may incorporate such measurements into evaluating driving behavior.

Exemplary Aspects

The present embodiments may relate to customer selection and use of ADAS systems, and/or pricing insurance to corresponding operator risk models or profiles. A number of hypotheses resolve around ADAS. For instance, good drivers may become bad drivers as they become dependent on ADAS instead of their natural good driving skills. For example, a driver may become reliant on a blind spot indicator instead of looking over their shoulder.

On the other hand, bad drivers may become artificially better drivers as they rely on ADAS systems to tell them when they are performing poorly and correct driver actions automatically. For example, emergency breaking may occur frequently, although no collision occurs.

Because of multiple false positives, a potentially unsafe environment may be created where the driver acknowledges the warning exists, but ignores taking action or deems not critical/accurate based upon previous experiences. For example, ADAS may ask the driver to place their hands on wheel due to an impending driver takeover. However, because of multiple false positives where no action was actually necessary, the driver knowingly ignores and the vehicles crashes.

Also, ADAS warning alerts may be ignored when drivers interpret the warning as not important or critical regardless of ADAS accuracy. For example, ADAS may warn the driver, and indicated that human takeover from autopilot is warranted. However, past driver conditioning causes the driver to deem the warning as not critical, increasing the likelihood of a vehicle collision.

Therefore, as ADAS adoption increases, ADAS dependence and/or reliance by drivers may result in difficulties in accurately determine potential or actual risk with safety features, vehicles, and/or operators.

The present embodiments may relate to collecting various data points to create a price to risk model. For instance, the data points may relate to: (i) previous driving/claim history; (ii) build sheet data; (iii) # of ADAS features equipped on vehicle; (iv) ADAS on/off (manual vs auto); (v) history of ADAS system turned on/off (such as manually turning off Lane Departure Warning); (vi) collection of data showing how driver responds to or ignores ADAS warnings; (vii) # of times ADAS Triggers Per Vehicle Ignition (weighted Safety Impact and ROI on Safety); (viii) emergency breaking; (ix) lane keep; (x) lane departure warning; (xi) blind spot warning; (xii) front/rear cross traffic alert; (xiii) adaptive cruise control; (xiv) park assist; (xv) automatic high beam; (xvi) reaction baseline to ADAS engagement (how driver reacts to ADAS when enabled and activated); and/or (xvii) VR simulation to pre-rate.

Additionally or alternatively, the data points may relate to: knowledge and training on ADAS (or experience); speed; GPS location; frequency of vehicle rental annually; frequency of vehicle sharing annually; quality of vehicle brand and ADAS system, ambient traffic conditions (density, speed, time of day); rating should decrease over time as technology improves to newest model year; miles driven annually or times of day that commute typically happens; and/or exhibiting traits over time of good or preferred driving behaviors, especially in risky or heavy traffic environments.

Exemplary Computer System for Generating, Modifying, and/or Using Driver Profiles FIG. 1 is a block diagram of an exemplary system 10 for identifying driving behavior, and generating, modifying, and/or using driver profiles or operator profiles. The system 10 may include a vehicle 12 having an on-board system 14, as well as a computer system 16, a third party server 18, and a network 20. While FIG. 1 depicts vehicle 12 as an automobile, vehicle 12 may instead be a truck, motorcycle, or any other type of land-based vehicle capable of carrying at least one human passenger (including the operator).

Network 20 may be a single wireless network, or may include multiple cooperating and/or independent networks of one or more types (e.g., a cellular telephone network, a wireless local area network (WLAN), the Internet, etc.). On-board system 14 and third party server 18 may both be in communication with the computer system 16 via network 20. While FIG. 1 shows only a single vehicle 12 and a single third party server 18, it is understood that computer system 16 may communicate (e.g., via network 20) with any number of different vehicles (e.g., one or more other vehicles similar to vehicle 12, with on-board systems similar to on-board system 14) and/or any number of different third party servers.

Third party server 18 may be a server of an entity that is not affiliated with either the operator of vehicle 12 or the entity owning, maintaining, and/or using computer system 16, and may be remote from computer system 16 and/or vehicle 12. For example, in various different embodiments discussed further below, third party server 18 may be a server associated with a provider of a mapping service, a provider of a weather information service, an auto repair shop, an auto maker, an auto dealership, an auto parts supplier, an entity that determines credit scores, and so on. As used herein, the term "server" may refer to a single server, or multiple servers communicating with each other.

On-board system 14 may include a first external sensor 30 and a second external sensor 32, each being configured to sense an environment external to vehicle 12 (i.e., to sense physical characteristics of the environment external to vehicle 12), such as a still image or video camera device, a lidar (laser remote sensing, or light detection and ranging) device, a radar device, or a sonar device, for example. Each of the external sensors 30, 32 may be located on or inside vehicle 12. For example, one or both of the external sensors 30, 32 may be permanently affixed to vehicle 12 (e.g., on the exterior or interior of the frame, on the dashboard, on the inner or outer surface of a windshield, etc.), or may be temporarily affixed to, or simply placed on or in, some portion of the vehicle 12 (e.g., placed on top of the dashboard, or in a device holder affixed to the windshield, etc.).

External sensor 30 and/or external sensor 32 may be included in a general purpose computing device (e.g., as a software application and associated hardware of a smartphone or other portable computer device), or may be a dedicated sensor device. In the exemplary system 10 shown in FIG. 1, external sensor 30 is located on or inside vehicle 12 such that it senses the environment in a forward-facing range 34, while external sensor 32 is located on or inside vehicle 12 such that it senses the environment in a rear-facing range 36. In some embodiments, the external sensor 30 and external sensor 32 may collectively provide a 360 degree sensing range. In other embodiments, however, the external sensor 30 and external sensor 32 may be redundant sensors (of the same type, or of different type) that each provide a 360 degree sensing range. In still other embodiments, either the external sensor 30 or external sensor 32 may be omitted, or the on-board system 14 may include more than two external sensors.

Each of external sensors 30, 32 may generate data, or analog information, that is indicative of the sensed external environment. In one embodiment where external sensor 30 is a digital video camera device, for example, external sensor 30 may generate data corresponding to frames of captured digital video. As another example, in one embodiment where external sensor 30 is a digital lidar device, external sensor 30 may generate data corresponding to frames of captured digital lidar information.

On-board system 14 may also include one or more internal sensors 38. In some embodiments, internal sensor(s) 38 may include one or more sensors designed to detect the presence of passengers. For example, internal sensor(s) 38 may include inward-facing digital cameras arranged to capture at least a portion of an interior (cabin) of vehicle 12, and/or one or more seat or weight sensors configured to detect the presence of the operator and/or passengers in the respective seat(s). As another example, internals sensor(s) 38 may instead (or also) include seatbelt sensors that are configured to detect when each seatbelt in vehicle 12 is engaged or not engaged. In certain embodiments where internal sensor(s) 38 include an inward-facing camera, the camera may be permanently affixed to vehicle 12 (e.g., on the interior of the frame, on the dashboard, on the inner surface of a windshield, etc.), or may be temporarily affixed to, or simply placed on or in, some portion of vehicle 12 (e.g., placed on top of the dashboard, or in a device holder affixed to the windshield, etc.). Moreover, a camera of internal sensor(s) 38 may be included in a general purpose computing device (e.g., as a software application and associated hardware of a smartphone or other portable computer device), or may be a dedicated sensor device.

On-board system 14 may also include an Advanced Driver Assistance System (ADAS) 22 that utilizes, but is not limited to utilizing, a braking subsystem 40, a speed subsystem 42, a steering subsystem 44, a diagnostics subsystem 46, and/or one or more different subsystems not shown in FIG. 1. By utilizing any one or more of the aforementioned subsystems and/or sensors (e.g., sensors 30, 32, 38), ADAS 22 may include a forward collision warning feature, a blind spot indication feature, a cruise control feature, a lane departure warning feature, an automatic high beam feature, and other advanced driver assistance features for vehicle 12.

For example, ADAS 22 including a forward collision warning feature may employ speed subsystem 42, a radar device, a lidar device, and/or a camera device (e.g., external sensor 30) to detect an imminent crash, and/or a GPS subsystem (e.g., G-PS 48) to detect fixed dangers associated with a particular registered location, such as an approaching stop sign. In some embodiments, the GPS subsystem 48 may generate data indicative of a current location of vehicle 12, and in other embodiments, the subsystem 48 may use other positioning techniques instead of GPS, such as cell tower triangulation, for example.

Once the detection is done, ADAS 22 may either provide an alert to vehicle 12 (e.g., via diagnostics subsystem 46) when there is an imminent collision or take action autonomously without any driver input, such as by braking, slowing speed, and/or steering (e.g., via braking subsystem 40, speed subsystem 42, and/or steering subsystem 44, respectively). ADAS 22 may also generate contextual data that describes characteristics of driving behavior (e.g., speeding, accelerating, braking, lane shifting, weaving patterns, cornering, etc.) that led to either activation of the alert or the autonomous action, via braking subsystem 40, speed subsystem 42, steering subsystem 44, diagnostics subsystem 46, and/or one or more different subsystems not shown in FIG. 1. Similarly, ADAS 22 including a blind spot indication feature may employ external sensor 32 to sense the environment in a rear-facing range 36.

ADAS 22 may be a combination of hardware and software components that provides data that may use one or more of the aforementioned subsystems and/or sensors to provide driver assistance for various driving activities. Such subsystems may be hardware, firmware and/or software subsystems that monitor and/or control various operational parameters of vehicle 12. As shown in FIG. 1, the diagnostics subsystem 46 may provide an alert to vehicle 12 when ADAS 22 has detected an event, such as another vehicle near the front, rear, or side of vehicle 12, lane departure, cruise control, or any other event ADAS 22 is configured to detect. The diagnostics subsystem 46 may also generate other information pertaining to the operation of vehicle 12, such as alert information to indicate that one or more components of vehicle 12 is/are in need of replacement, an upgrade, and/or servicing. For example, diagnostics subsystem 46 may generate a service alert when tire pressure is low (e.g., based upon a signal from a tire pressure sensor not shown in FIG. 1), when the engine is overheating (e.g., based upon a temperature sensor in the engine compartment, also not shown in FIG. 1), when an oil change is recommended, and so on. Subsequent to, prior to, or independent of ADAS 22 providing an alert to the vehicle 12 when ADAS 22 has detected an event, the braking subsystem 40 may generate data indicative of how the brakes of vehicle 12 are applied (e.g., an absolute or relative measure of applied braking force, or a binary indicator of whether the brakes are being applied at all, etc.), the speed subsystem 42 may generate data indicative of how fast the vehicle 12 is being driven (e.g., corresponding to a speedometer reading, an accelerometer measurement, and/or an operator input such as depression of a gas pedal, etc.), and the steering subsystem 44 may generate data indicative of how the vehicle 12 is being steered (e.g., based upon the operator's manipulation of a steering wheel, or based upon automated steering control data, etc.)

The aforementioned braking subsystem 40, speed subsystem 42, steering subsystem 44, diagnostics subsystem 46, and/or one or more different subsystems not shown in FIG. 1 may also generate data indicating whether ADAS 22 has taken control autonomously (without any driver input) over the subsystems 40, 42, 44 for vehicle 12. For example, the speed subsystem 42 may generate data indicating whether a cruise control feature of ADAS 22 is currently activated, and/or the braking subsystem 40 or steering subsystem 44 may generate data indicating whether assisted braking and/or assisted steering features of ADAS 22 are currently activated. As other examples, a unit of on-board system 14 (e.g., diagnostics subsystem 46, or another unit not shown in FIG. 1) may generate data indicating whether vehicle 12 is in an automated transmission mode or a manual transmission mode, or whether the driving of vehicle 12 is currently subject to complete automated/machine control rather than manual (human) control.

In some embodiments, the on-board system 14 may not include one or more of the subsystems 40, 42, 44, 46, 48, one or both of external sensors 30 and 32, and/or internal sensor(s) 38, and/or the on-board system 14 may include additional devices or subsystems not shown in FIG. 1. Moreover, one or more subsystems in on-board system 14 may be included in a general purpose computing device, such as a smartphone. For example, the GPS subsystem 48 may include a software application running on a smartphone that includes the appropriate hardware (e.g., an antenna and receiver).

On-board system 14 may also include a data collection unit 50 configured to receive data and/or analog signals from external sensors 30, 32, internal sensor(s) 38, some or all of subsystems 40, 42, 44, 46, 48, and/or ADAS 22. The data collection unit 50 may collect the data and/or analog signals substantially in real time, and in any of various different ways, according to different embodiments. In some embodiments, for example, the data collection unit 50 may periodically sample data and/or analog signals from the various external sensors 30, 32, internal sensor(s) 38, subsystems 40, 42, 44, 46, 48, and/or ADAS 22, or be notified by the respective sensors or subsystems when new data is available.

In some embodiments' the data collection unit 50 may receive data from one or more of the external sensors 30, 32, internal sensor(s) 38, one or more of subsystems 40, 42, 44, 46, 48 and/or ADAS 22 via a wireless link, such as a Bluetooth link. Alternatively, one or more of subsystems 40, 42, 44, 46, 48, internal sensor(s) 38, external sensors 30, 32 and/or ADAS 22 may provide data to data collection unit 50 via messages placed on a controller area network (CAN) bus (not shown in FIG. 1) or other suitable bus type, and/or via an on-board diagnostics (OBD) system (also not shown in FIG. 1). For example, the data collection unit 50 may collect information from one or more of subsystems 40, 42, 44, 46 via one or more OBD ports. In some embodiments, the data collection unit 50 may collect data using a mix of interface and/or bus types (e.g., a Bluetooth interface to receive data from sensors 30, 32 and internal sensor(s) 38, an OBD port to receive data from ADAS 22 and/or the diagnostics subsystem 46, and a CAN bus to receive data from subsystems 40, 42, 44).

In some embodiments where one or more of external sensors 30, 32, internal sensor(s) 38, one or more of subsystems 40, 42, 44, 46, 48, and/or ADAS 22 generate analog signals, either the respective sensors/subsystems/ADAS or the data collection unit 50 may convert the analog information to a digital format. Moreover, the data collection unit 50 may convert data received from one or more of external sensors 30, 32, internal sensor(s) 38, one or more of subsystems 40, 42, 44, 46, 48, and/or ADAS 22 to different digital formats or protocols. After collecting (and possibly converting) the data from the various sensors/subsystems/ADAS, the data collection unit 50 may store the data in a memory 52. The memory 52 may be any suitable type of data storage, such as a random access memory (RAM), a flash memory, or a hard drive memory, for example.

On-board system 14 may also include a data processing unit 54 that is coupled to the data collection unit 50. The data processing unit 54 may include one or more processors, or represent software instructions that are executed by one or more processors of on-board system 14, and may be configured to process the data collected by data collection unit 50 and stored in memory 52 for various purposes. In one embodiment, for example, data processing unit 54 simply packages data collected by data collection unit 50 into a format suitable for transmission to computing system 16. Alternatively, or in addition, data processing unit 54 may analyze the collected data to generate various types of information that may be used to update an operator profile, as discussed further below in connection with computing system 16. Data processing unit 54 may include, or be associated with, a memory 56 for storing outputs of the data analysis and/or other processing. Memory 56 may be any suitable type of data storage, such as a RAM, a flash memory, or a hard drive memory, for example. Memory 52 and memory 56 may be separate memories, or parts of a single memory, according to different embodiments.

Data processing unit 54 may be coupled to an interface 60, which may transmit the data received from data processing unit 54 to computer system 16 via network 20. Interface 60 may include a transmitter and one or more antennas, for example. In one alternative embodiment, interface 60 may instead be an interface to a portable memory device, such as a portable hard drive or flash memory device. In this embodiment, the portable memory device may be used to download data from memory 56 of data processing unit 54 or memory 52 of data collection unit 50, and may be manually carried to computer system 16 without utilizing network 20. In another alternative embodiment, a Bluetooth or other short-range link may be used to download data from memory 56 or memory 52 to a portable computer device (e.g., a laptop or smartphone), which may in turn be used to transmit the data to computer system 16 via network 20. In some embodiments, interface 60 may represent multiple types of different interfaces used for different types of data (e.g., a WLAN transceiver for data from external sensors 30, 32, a smartphone cellular transceiver for data from internal sensor(s) 38, and a flash memory device port for data from subsystems 40, 42, 44, 46, 48 and ADAS 22).

In some embodiments, the data generated by data processing unit 54 and stored in memory 56 may be automatically sent to interface 60 for transmission to computer system 16. For example, the data may be sent to interface 60 at regular time intervals (e.g., once per day, once per hour, etc.). In other embodiments, the data may be sent to computer system 16 in response to a query from computer system 16 that is received via network 20, or in any other suitable manner. Once the data is provided to computer system 16, the data may be subject to further processing to evaluate driving behavior for a particular driving activity (e.g., to determine a likelihood level that a feature of ADAS would have provided an alert had the feature been activated, to generate or modify a profile for the operator of vehicle 12 with the determined likelihood level), as discussed further below.

Computer system 16 may be an electronic processing system (e.g., a server) capable of performing various functions, and may include an interface 62 configured to receive data from on-board system 14 of vehicle 12, and data from third party server 18, via network 20. Interface 62 may be similar to interface 60 of on-board system 14, for example. In certain embodiments where a portable memory device (rather than network 20) is used to transfer at least some of the data from on-board system 14 to computer system 16, interface 62 may include an interface to a portable memory device, such as a portable hard drive or flash memory device, for example.

Computer system 16 may also include a data collection unit 70 coupled to interface 62. Data collection unit 70 may be configured to receive/collect the data received by interface 62, and to store the collected data in a memory 72. Memory 72 may be any suitable type of data storage, such as a RAM, a flash memory, or a hard drive memory, for example. Data collection unit 70 may be coupled to a data analysis unit 74. Data analysis unit 74 may include one or more processors, or software instructions that are executed by one or more processors of computing system 16, and may be configured to process the data collected by data collection unit 70 and stored in memory 72 for various purposes according to different embodiments, as discussed further below.

Generally, data analysis unit 74 may analyze data from vehicle 12 (e.g., the data received from on-board system 14 via interface 60) and a number of other vehicles stored in historical driving data database 78 to evaluate driving behavior (e.g., determine whether a particular driving behavior would have caused an ADAS alert to activate had the ADAS feature been activated, had the ADAS feature not have malfunctioned or been inoperable or disabled, or had the operator been driving a vehicle with the ADAS feature installed within the vehicle), determine a likelihood level that the feature of the ADAS would have provided the alert (either a false positive or, alternatively, a valid alert) had the feature been activated, and generate and/or modify/update driver profiles stored in an operator profiles database 76 with the likelihood level. Driver profiles database 76 and historical driving data database 78 may be stored in memory 72 or may be stored external to computer system 16 (e.g., memory 52 or other memory units).

In the exemplary system 10 of FIG. 1, data analysis unit 74 may include a driving behavior identification unit 80, a profile generation/update unit 82, and an ADAS likelihood indicator 88. In other embodiments, data analysis unit 74 does not include one or more of units 80, 82, 88, and/or includes additional units not shown in FIG. 1. For example, one or more of units 80, 82, 88 may instead be implemented by data processing unit 54 of on-board system 14 in vehicle 12, or may be entirely absent from system 10. In one embodiment, each of units 80, 82, 88 may include a set of instructions stored on a tangible, non-transitory computer-readable medium and capable of being executed by one or more processors of computer system 10 to perform the functions described below. In another embodiment, each of units 80, 82, and/or 88 may include a set of one or more processors configured to execute instructions stored on a tangible, non-transitory computer-readable medium to perform the functions described below.

Figure 2:
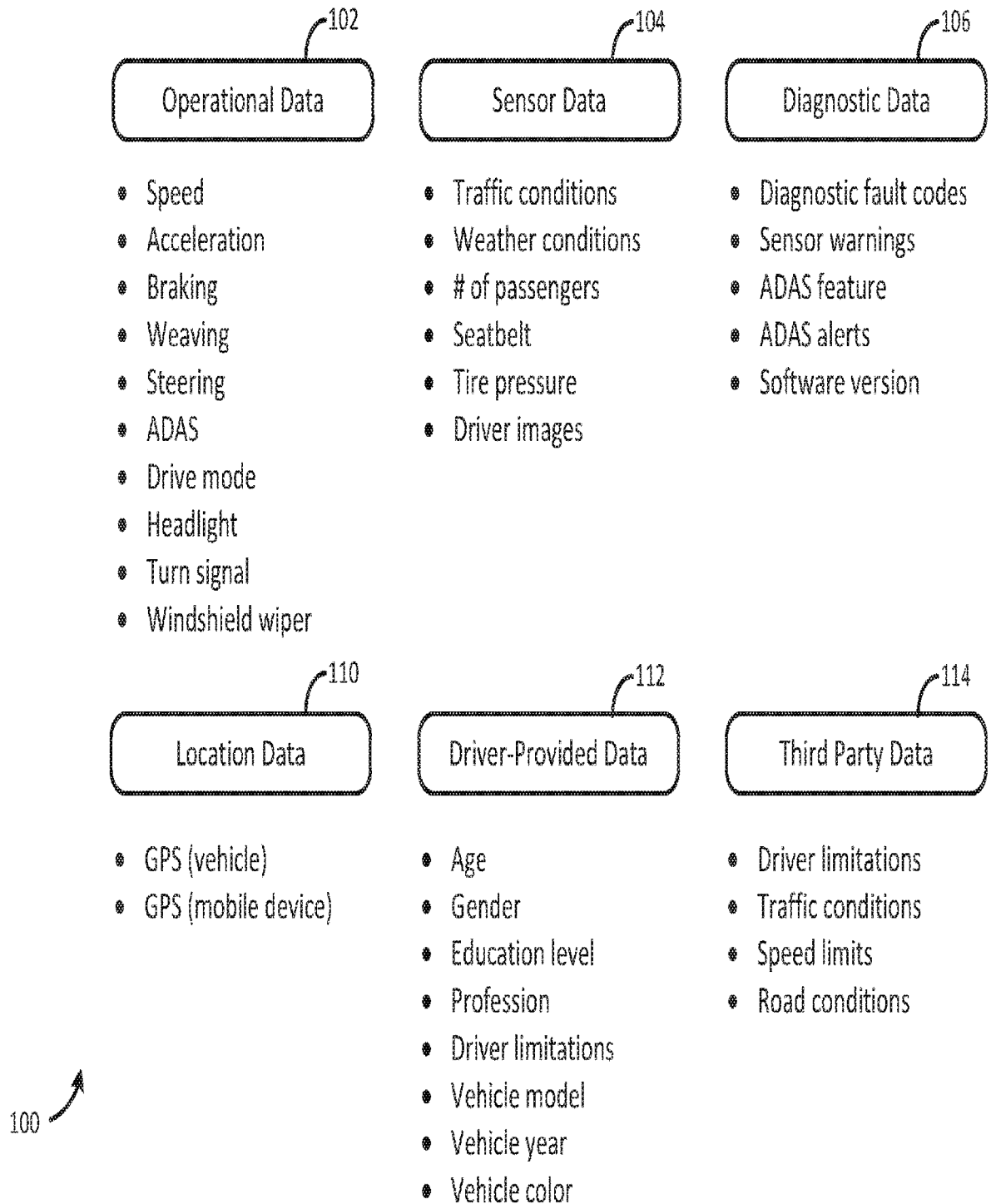
FIG. 2 depicts exemplary data categories that may be utilized by the computer system of FIG. 1 to identify driving behavior, and/or generate or modify an operator profile.
Figure 3:
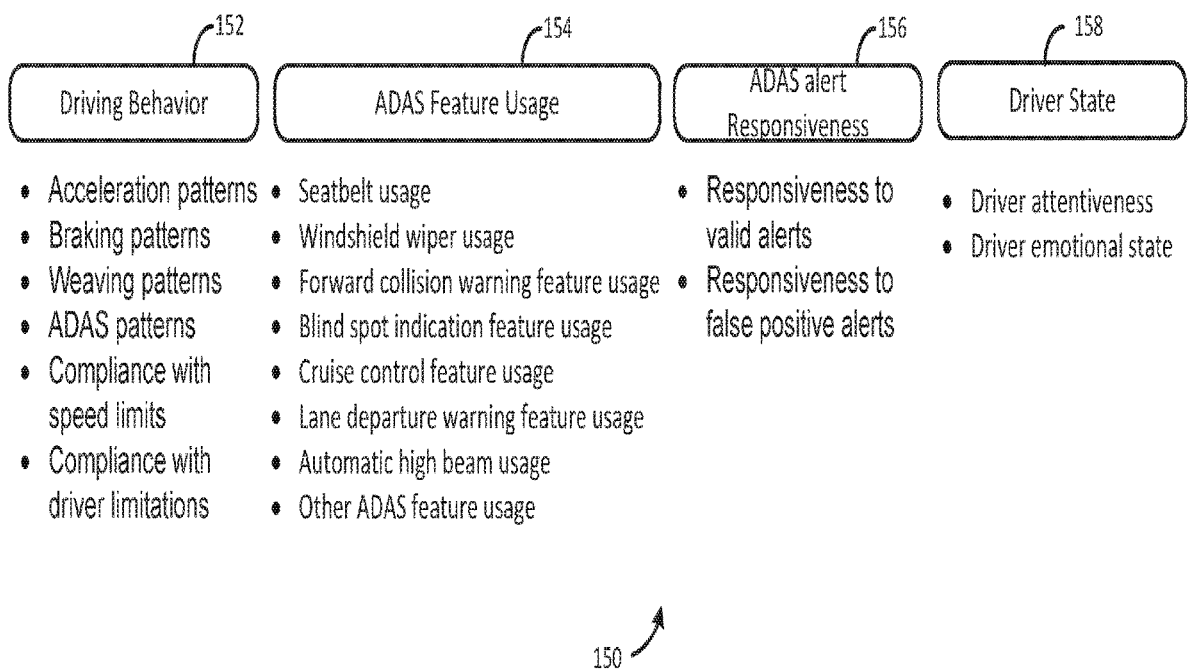
FIG. 3 depicts exemplary profile information categories that may be determined by the computer system of FIG. 1 when identifying driving behavior patterns and/or generating or modifying an operator profile.

Driving behavior identification unit 80 may be generally configured to analyze or process measurements data received from vehicle 12 (e.g., from interface 60 of on-board system 14, as discussed above) to detect and/or identify various types of driving behaviors, as listed in driving behavior information 152 in FIG. 3 when ADAS of vehicle 12 has been deactivated. Specifically, driving behavior identification unit 80 may receive and/or analyze measurements data generated by subsystems 40, 42, 44, and/or 46 of ADAS 22 at the time of the driving activity, particularly when at least one feature of an Advanced Driver Assistance System (ADAS) of vehicle 12 has been deactivated (e.g., ADAS feature has been turned off, ADAS feature malfunctioned or is malfunctioning, ADAS feature is inoperable or disabled, driver did not drive a vehicle with ADAS feature installed within the vehicle, etc.) for the driving activity. The measurements data may be operational data 102 or diagnostic data 106, as described in FIG. 2, from either vehicle 12 (e.g., from interface 60 of on-board system 14, as discussed above) or a mobile electronic device of an operator or passenger. The measurements data may also be indicative of speeding, accelerating, braking, lane shifting, weaving patterns, etc. For example, driving behavior identification unit 80 may analyze data generated by any individual sensor, such as external sensor 30 to determine an average (and/or a minimum, etc.) tailgating distance between vehicle 12 and other vehicles in front of vehicle 12, and/or to determine proper/improper lane usage, etc., when ADAS 22 has been deactivated, or is inoperable.

As another example, driving behavior identification unit 80 may determine a first set of acceleration, braking, and/or weaving patterns of the operator of vehicle 12 and tag that set as being associated with the presence of one or more accompanied passengers, and determine a second set of acceleration, braking, and/or weaving patterns of the operator of vehicle 12 and tag that set as being associated with an absence of accompanied passengers. Driving behavior identification unit 80 may determine which sets correspond to the presence of one or more accompanied passengers using data generated by internal sensor(s) 38, for example.

Such sets of information may be probative of different driving behaviors associated with the operator of the vehicle 12 depending on whether other passengers are present in the vehicle 12, and may also be probative for the driving behavior identification unit 80 to determine how the operator responds to an alert provided by ADAS 22 depending on whether other passengers are in the vehicle 12. For example, upon analysis of the vehicle data from vehicle 12 via interface 60, if the driving behavior identification unit 80 determines that the first set of acceleration, braking, and/or weaving data of the operator of vehicle 12 shows a change in data when compared to vehicle data (e.g., data generated by subsystems 40, 42, 44, and/or 46 of ADAS 22) that caused a valid ADAS alert to be generated at the vehicle 12, driving behavior identification unit 80 may determine that the operator exhibited safe, risk averse, or responsive driving behavior by abiding by the valid ADAS alert.

If the driving behavior identification unit 80 determines that the second set of acceleration, braking, and/or weaving data of the operator of vehicle 12 does not show a change in data when compared to vehicle data (e.g., data generated by subsystems 40, 42, 44, and/or 46 of ADAS 22) that caused a valid ADAS alert at the vehicle 12, driving behavior identification unit 80 may determine that a valid ADAS alert was not followed. Based upon a comparison of driving behaviors associated with the first and second sets, driving behavior identification unit 80 may also determine that the operator exhibits safer driving behavior when in the presence of one or more accompanied passengers.

As another example, driving behavior identification unit 80 may determine a first average tailgating distance of the operator of vehicle 12 and tag that distance as being associated with icy road conditions, determine a second average tailgating distance of the operator of vehicle 12 and tag that distance as being associated with wet road conditions, and/or determine a third average tailgating distance of the operator of vehicle 12 and tag that distance as being associated with dry road conditions. Driving behavior identification unit 80 may determine which distances correspond to the presence of icy, wet, or dry roads using data generated by external sensors 30 and/or 32, and/or data from a weather information service (e.g., in an embodiment where third party server 18 or another server not shown in FIG. 1 is associated with the weather information service), for example. Such tailgating distance information may be probative of different driving behaviors associated with the operator of the vehicle 12 depending on various road conditions, and may also be probative for the driving behavior identification unit 80 to determine how the operator responds to an alert provided by ADAS 22 in such road conditions.

Driving behavior identification unit 80 may be generally configured to receive and/or process historical driving data received from stored historical data 78. The historical driving data may include a history of at least one driving activity aided by activation of an alert from the ADAS feature that has been deactivated for the operator of vehicle 12. It may contain records of measurement data that have caused ADAS alerts to have been generated in the past.

Driving behavior identification unit 80 may then subsequently compare the received historical driving data with the measurements data described above to determine the likelihood of whether the measurements data would have caused activation of alerts (either false positive or alternatively, valid alerts) from diagnostics subsystem 46 of ADAS 22. For example, if historically, as indicated by the stored historical data 78, false positive alerts have been activated in the past, and the measurements data is associated with the same location, the driving behavior identification unit 80 may determine that the measurements data would have likely caused activation of false positive alerts from diagnostics subsystem 46 of ADAS 22 of vehicle 12, and would have not likely caused activation of valid alerts.

The historical driving data may include contextual data associated with other drivers and/or the operator of vehicle 12. Contextual data, which may be generated by subsystems like subsystems 40, 42, 44, and/or 46 of FIG. 1, may indicate driving behaviors (e.g., speeding, accelerating, braking, lane shifting, weaving patterns, etc.) that caused either activation of the alert (for both false positive and valid alerts) by ADAS in other vehicles and/or vehicle 12. A comparison of the contextual data with the measurement data associated with vehicle 12 may show whether the measurement data is consistent with the contextual data.

A consistent correlation between measurement data and contextual data may represent a finding that the driving behavior of driver of vehicle 12 was similar to other drivers, and if the contextual data indicates driving behavior that caused activation of an alert historically, the likelihood that the driving behavior of driver of vehicle 12 may have caused activation of an alert had ADAS not been deactivated (or inoperable) may be high. For example, if the operator of vehicle 12 provides measurements data (e.g., a steering pattern when ADAS 22 has been deactivated in vehicle 12) that is similar to contextual data (e.g., that includes the same or similar steering pattern that has caused activation of an alert for 500 vehicles), it may be highly likely that the measurements data may have also caused the same alert for vehicle 12 had ADAS 22 been activated (or operable).

Similarly, an inconsistent correlation between measurement data and contextual data may represent a finding that the driving behavior of driver of vehicle 12 was not similar to other drivers, and if the contextual data indicates driving behavior that caused activation of an alert historically, the likelihood that the driving behavior of driver of vehicle 12 may have caused activation of an alert had ADAS not been deactivated (or inoperable) may be low For example, if the operator of vehicle 12 provides measurements data (e.g., a steering pattern when ADAS 22 has been deactivated in vehicle 12) that is different than contextual data (e.g., that includes an opposite steering pattern that has caused activation of an alert. for 500 vehicles), it may be highly unlikely that the measurements data may have also caused the same alert for vehicle 12 had ADAS 22 (e.g., a feature that is sensitive to steering patterns) been activated (or operable).

The comparison results of the measurements data with the contextual data, which shows whether the measurements data is consistent with the contextual data, may be stored in memory 72 or may be stored external to computer system 16 (e.g., memory 52 or other memory units), and/or may be utilized by ADAS likelihood indicator 88 to generate or update a likelihood level for the operator of vehicle 12. The likelihood level may measure how likely vehicle 12 may have provided an ADAS alert had ADAS 22 been activated, by comparing the driving behavior of the operator of vehicle 12 with historical driving data associated with other drivers and/or the operator of vehicle 12 when ADAS, vas activated (or operable).

The historical driving data may also include reaction data associated with other drivers and/or the operator of vehicle 12. Reaction data, which may be generated by subsystems like subsystems 40, 42, 44, and/or 46 of FIG. 1, may indicating speeding, accelerating, braking, lane shifting, and/or weaving patterns of other drivers and/or the operator of vehicle 12 in response to the alert generated by ADAS (e.g., subsystem 46 of ADAS 22) as a result of the driving behavior (i.e., contextual) that caused either activation of the alert (for both false positive and valid alerts). The driving behavior identification unit 80 may identify reaction data as data corresponding to a timestamp tag just after the time (within a pre-determinable threshold) in which the alert was provided to vehicle 12.

A comparison of the identified reaction data with the contextual data may show whether the reaction data is consistent with the contextual data. A consistent correlation between reaction data and contextual data may represent a finding that an operator's driving behavior did not change in response to the alert (or operator took no action). Further, a consistent correlation may represent either safe, risk averse, or responsive driving behavior or unsafe driving behavior For instance, if the alert is classified as a false positive alert (e.g., based upon stored historical data 78), a consistent correlation indicates that the operator may have not followed or responded to the false positive alert, which may be indicative of safe, risk averse, or responsive driving behavior. However, if the alert is classified as a valid alert (e.g., based upon stored historical data 78), a consistent correlation indicates that the operator may have not followed or responded to the valid alert, which may be indicative of unsafe driving behavior.

Similarly, an inconsistent correlation between reaction data and contextual data may represent a finding that an operator's driving behavior did change in response to the alert (or operator took action). Further, an inconsistent correlation may represent either safe, risk averse, or responsive driving behavior or unsafe driving behavior. For instance, if the alert is classified as a valid alert (e.g., based upon stored historical data 78), an inconsistent correlation indicates that the operator has taken action in response to the valid alert, which may be indicative of safe, risk averse, or responsive driving behavior. However, if the alert is classified as a false positive alert (e.g., based upon stored historical data 78), an inconsistent correlation indicates that the operator may have taken action in response to the false positive alert, which may be indicative of unsafe driving behavior.

The comparison results of the identified reaction data with the contextual data, which shows whether the reaction data is consistent with the contextual data, may be stored in memory 72 or may be stored externally to computer system 16 (e.g., memory 52 or other memory units). Accordingly, the historical driving data may include historical information as to how other drivers and/or driver 12 react to various ADAS alerts. As will be described below, the ADAS likelihood indicator 88 may utilize the comparison results of the identified reaction data with the contextual data (i.e., historical driving data) to generate or update a likelihood level for the operator of vehicle 12.

In some embodiments, each of one or more driving behaviors characterized by driving behavior identification unit 80 may be associated with tags or other metadata indicating the circumstances in which the driving behavior occurred. As briefly described above, driving behavior identification unit 80 may identify the contextual data generated by ADAS 22 as the data associated with a tagged first timestamp at the time ADAS 22 activated an alert or autonomous action, and may identify the reaction data generated by subsystems 40, 42, and/or 44 as the data associated with a tagged second timestamp that is just after the first timestamp (within a pre-determinable threshold), for example.

Driving behavior identification unit 80 may use other tags or other metadata associated with the contextual data and reaction data in order to pair them as a set to characterize driving behavior in response to an ADAS alert. For example, driving behavior identification unit 80 may identify contextual data and reaction data that are both associated with an operator's name or other identifier, in addition to the first and second timestamps, to character the particular driver's driving behavior in response to an ADAS alert. As another example, driving behavior identification unit 80 may identify contextual data and reaction data that are both associated with a location, in addition to the first and second timestamps, to character the general driving behavior (i.e., not to a particular driver) in response to an ADAS alert at the location.

In alternative embodiments, data processing unit 54, as opposed to driving behavior identification unit 80, may identify some or all of the driving behaviors. In such embodiments, driving behavior identification unit 80 may be excluded from data analysis unit 74, or may operate in conjunction with data processing unit 54. For example, data processing unit 54 may identify some types of driving behaviors, while driving behavior identification unit 80 identifies other types of driving behaviors and/or higher-level driving behaviors. In one such embodiment, for instance, data processing unit 54 may determine tailgating distances to other vehicles using data from external sensor 30 and image recognition algorithms (e.g., to identify an object ahead of vehicle 12 as another vehicle), and driving behavior identification unit 80 may use that information, along with data from third party server 18 or another server, to determine an average tailgating distance for each of a number of different weather conditions (e.g., sunny, partly cloudy, cloudy, fog, rain, snow, icy roads, etc.).

Profile generation/update unit 82 may be generally configured to use the driving behaviors or other information identified by driving behavior identification unit 80 and/or data processing unit 54, to populate and/or update fields of an operator profile for the operator of vehicle 12 in driver profiles database 76, such as the likelihood level. Each of a number of different drivers (including the operator of vehicle 12) may be associated with a different profile in driver profiles database 76, with each profile having one or more fields of information.

Profile generation/update unit 82 may also be generally configured to receive the likelihood level generated by ADAS likelihood indicator 88 to populate and/or update a likelihood level field of an operator profile for the operator of vehicle 12 in driver profiles database 76. Although profile generation/update unit 82 and ADAS likelihood indicator 88 are shown as separate components of data analysis unit 74, in some embodiments, profile generation/update unit 82 may include the functionalities of ADAS likelihood indicator 88. In such embodiments, profile generation/update unit 82 may use the driving behaviors identified by driving behavior identification unit 80 and/or data processing unit 54, to generate a likelihood level for the operator of vehicle 12 and populate and/or update the likelihood level field of an operator profile for the operator of vehicle 12 in driver profiles database 76. In some embodiments, each profile also includes a number of fields indicative of demographic and/or personal information (e.g., gender, age, education level, profession, disabilities/impairments/limitations, etc.), vehicle information (e.g., vehicle model, year, and/or color), and/or other information.

ADAS likelihood indicator 88, as described above, may receive comparison results of the measurements data with the contextual data, which shows whether the measurements data is consistent with the contextual data, that is stored in memory 72 or may be stored external to computer system 16 (e.g., memory 52 or other memory units) and subsequently generate or update a likelihood level for the operator of vehicle 12. The likelihood level may measure how likely vehicle 12 may have provided an ADAS alert had ADAS 22 been activated (or operable or functioning), by comparing the driving behavior of the operator of vehicle 12 with historical driving data associated with other drivers and/or the operator of vehicle 12 when ADAS was activated (or operable). The historical driving data may represent either driver-specific historical data based upon the operator's driving profile, specific historical data based upon profiles of other drivers, or a combination of both.

In some embodiments, ADAS likelihood indicator 88 may receive measurements data of the operator from profile generation/update unit 82. In other embodiments, ADAS likelihood indicator 88 may receive the measurements data of the operator from driver profiles 76. The measurements data of the operator may include at least one driving activity when the ADAS was deactivated (or inoperable, or malfunctioning). In some embodiments, ADAS likelihood indicator 88 may receive historical driving data from historical data 78. In other embodiments, ADAS likelihood indicator 88 may receive historical driving data from driver profiles 76. The historical driving data includes a history of at least one driving activity aided by activation of the alert from the ADAS feature that has been deactivated (or inoperable) at vehicle 12, as indicated in the measurements data, for the operator and/or a plurality of drivers.

In order to determine how likely vehicle 12 may have provided an ADAS alert had ADAS 22 been activated, the ADAS likelihood indicator 88 may then compare the measurements data with the historical driving data, in some embodiments. For ease of computation, the historical driving data may be represented by a mathematical average of the number of times an alert from the ADAS feature was activated for the operator and/or the plurality of drivers, but other mathematical representations are contemplated (e.g., median, mode, etc.). In some embodiments, ADAS likelihood indicator 88 may select profiles of particular drivers that have common operational data 102 that are associated with the deactivated (or inoperable) ADAS feature as that of the operator. Upon selecting an operating parameter (i.e., one of the common operational data 102), ADAS likelihood indicator 88 may compare the measurements data associated with the selected operating parameter with the historical driving data associated with the same selected operating parameter For example, if a profile for the operator of the vehicle 12 indicates that the lane departure alert at a particular location (e.g., 41 8789° N, 87.6359° W) was deactivated (or inoperable, or malfunctioning), ADAS likelihood indicator 88 may identify profiles of particular drivers that also indicate frequency occurrences of the lane departure alert at 41.8789° N, 87.6359° W. After calculating a mathematical average (e.g., 100) of the number of the lane departure alerts from the ADAS that were activated for the plurality of drivers from the identified profiles, ADAS likelihood indicator 88 may compare the measurements for the operator of vehicle 12 with the historical driving data and determine that the both have a common location (e.g., 41.8789° N, 87.6359° W).

Based upon the comparison, ADAS likelihood indicator 88 may determine a likelihood level for the operator in accordance with a threshold tolerance configured in ADAS likelihood indicator 88. For instance, the likelihood level may indicate that it was highly likely that the vehicle 12 may have provided a lane departure alert had ADAS 22 been activated (e.g., 100 is above a threshold tolerance). ADAS likelihood indicator 88 may send the likelihood level to the profile generation/update unit 82 for the profile of the operator to update or be set with the likelihood level accordingly. In some embodiments, the ADAS likelihood indicator 88 may generate a notification including the likelihood level (e.g., that the number of alerts exceeded the threshold tolerance) for display, such as at a monitor (not shown in FIG. 1) of computer system 16 and/or on-board system 14.

In some embodiments, the profile generation/update unit 82 may transmit the profile (or portion thereof) of the operator (with the likelihood level information) to an entity that adjusts a price to risk model, credit rating, or insurance rating associated with the operator based upon the operator profile, or to an entity that reviews the operator profile in connection with a job sought by the operator offers a permanent or temporary credit, in connection with a good or service offered by the entity, based upon the operator profile. In some embodiments, the profile generation/update unit 82 itself may adjust a price to risk model, a credit rating, an insurance rating, a review, a permanent credit, or a temporary credit associated with the operator based upon the operator profile.

As described above, the likelihood level may depend on the number of times a particular ADAS alert has been activated, as described in the historical driving data. Generally, the more occurrences of activated ADAS alerts there are, as shown in the historical driving data, the greater the likelihood that the vehicle 12 would have provided ADAS alerts under similar circumstances. However, in some embodiments, the likelihood level may also depend on whether the ADAS alerts, as described in the historical driving data, were classified as either false positive or, alternatively, valid. For instance, the more occurrences of activated false positive ADAS alerts there are, as shown in the historical driving data, the lesser the likelihood level should be.

In some embodiments, if a comparison of measurements data with the historical driving data (e.g., contextual data) showed a high likelihood that a false positive alert would be provided by ADAS, yet a comparison of identified reaction data with the contextual data showed that most drivers did not follow the false positive alert by not changing their driving behavior in response to the false positive alert, the ADAS likelihood indicator 88 may decrease the likelihood level. If a comparison of measurements data with the historical driving data (e.g., contextual data) showed a high likelihood that a valid alert would be provided by ADAS, yet a comparison of identified reaction data with the contextual data showed that most drivers either did not follow or followed the valid alert, the ADAS likelihood indicator 88 may increase the likelihood level.

While FIG. 1 depicts an embodiment in which vehicle telematics data may be generated and transmitted to computer 16 by an on-board system 14, in other embodiments some or all of the vehicle telematics data may instead be generated and/or transmitted to computer 16 by a mobile electronic device (e.g., a smartphone, a wearable electronic device, and/or another mobile electronic device of the operator and/or a passenger of vehicle 12). For example, an accelerometer, gyroscope, compass, and/or camera of the operator's smartphone may be used to generate vehicle telematics data, which may be transmitted to computer 16 by either the smartphone itself or on-board system 14 (e.g., after the smartphone transmits the telematics data to on-board system 14 via a short-range communication technology such as WiFi or Bluetooth). In some embodiments where the operator's or passenger's mobile electronic device transmits some or all of the vehicle telematics data to computer 16, the mobile electronic device may include an interface (e.g., similar to interface 60) that is configured to transmit the data to computer 16 via network 20 or another network.

Exemplary Inputs for Identifying Driving Behavior and Generating or Modifying Driver Profiles FIG. 2 depicts exemplary data categories 100 that may be utilized by the system 10 of FIG. 1 to identify driving behavior, and/or generate or modify an operator profile, such as an operator profile included in driver profiles database 76 of computer system 16. The data categories 100 may include operational data 102, sensor data 104, diagnostic data 106, location data 110, driver-provided data 112, and/or third party data 114. In other embodiments, the data categories 100 may include more, fewer, and/or different categories of data, and/or each category shown in FIG. 2 may include more, fewer, and/or different types of data.

Operational data 102 may include one or more types of data relating to operation metrics of a vehicle, such as speed data, acceleration data, braking data, weaving data, steering data, ADAS data (e.g., whether/when a particular feature of ADAS is engaged), drive mode data (e.g., data indicating whether the operator selected a "comfort," "eco" or "sport" mode), headlight data (e.g., whether/when headlights are turned on), turn signal data (e.g., whether/when turn signals are used), and/or windshield wiper data (e.g., whether/when front and/or rear wipers are used). Some or all of operational data 102 may be data generated by subsystems 40, 42, 44, 46 and/or ADAS 22 of FIG. 1, one or more other subsystems of vehicle 12 not shown in FIG. 1, and/or a mobile electronic device of an operator or passenger.

Sensor data 104, which may overlap in definition with operational data 102 to some degree, may include one or more types of data indicative of internal and external conditions of a vehicle, and particularly conditions that may be captured by cameras, weight sensors, and/or other types of sensors. Sensor data 104 may include, for example, traffic condition data, weather condition data, data indicating the number of passengers in the vehicle, data indicating when particular seatbelts are used, data indicative of tire pressure, and/or driver image data. Some or all of sensor data 102 may be data generated by external sensor 30, external sensor 32, and/or internal sensor(s) 38 of FIG. 1, and/or by a mobile electronic device of an operator or passenger. For example, external sensor 30 and/or external sensor 32 may generate the traffic and/or weather data, internal sensor(s) 38 may generate the data indicative of number of passengers, seatbelt usage data, and/or driver image data, and a different sensor of vehicle 12 (not shown in FIG. 1) may generate the tire pressure data.

Diagnostic data 106 may include one or more diagnostic status codes indicative of the state of hardware and/or software systems of a vehicle, such as data indicative of safety alerts from various sensors (e.g., a check engine alert, a low tire pressure warning, an oil change reminder, etc.), data indicative of whether particular feature(s) of ADAS 22 are operational or malfunctioning or inoperable, data indicative of alerts from ADAS 22 including timestamps associated with the alerts, and/or data indicative of the current version of one or more units of software installed in the vehicle (e.g., for on-board system 14 of FIG. 1). Some or all of diagnostic data 106 may be data generated by diagnostic subsystem 46 of FIG. 1, for example.

Location data 110 may include one or more types of data indicative of vehicle location. For example, location data 110 may include location data obtained from a GPS unit installed in a vehicle (e.g., GPS subsystem 48 of FIG. 1), and/or location data obtained from a mobile device (e.g., smartphone, smart watch, etc.) of the operator that includes a GPS unit.

Driver-provided data 112 may include one or more types of data specific to the operator and his or her vehicle, such as driver age, driver gender, driver education level, driver profession, driver limitations, vehicle model, vehicle year, and/or vehicle color. As the label suggests, driver-provided data 112 may be data that the operator provided (e.g., when filling out an application or other form or questionnaire). Alternatively, some or all of driver-provider data 112 may be obtained in a different manner (e.g., provided by a third party, similar to third party data 114).

Third party data 114 may include one or more types of data sourced by one or more third party entities. For example, third party data 114 may include data indicative of specific driver limitations (e.g., vision impairment, motor skill impairment, etc.), which may be obtained from a governmental entity or other entity. As another example, third party data 114 may include data indicative of traffic conditions, speed limits, and/or road conditions, which may be obtained from a governmental entity, an entity that provides a mapping service, or another entity.

As noted above, the data in the exemplary data categories 100 may be analyzed by the system 10 of FIG. 1 to identify driving behavior, and/or generate or modify an operator profile, such as an operator profile included in driver profiles database 76 of computer system 16. Various examples of how data shown in FIG. 2 may be used to determine patterns in driving behavior, such as risk averse driving behavior, and/or determine/set profile information are provided below in connection with FIG. 3.

Exemplary Information Determined for Driver Profiles

FIG. 3 depicts exemplary profile information categories 150 that may be determined by the system 10 of FIG. 1 (e.g., by data analysis unit 74) when identifying driving behavior patterns and/or generating or modifying an operator profile, such as an operator profile included in driver profiles database 76 of computer system 16. The profile information categories 150 may include driving behavior information 152, feature usage information 154, alert responsiveness information 156, and/or driver state information 158. In other embodiments, the profile information categories 150 may include more, fewer, and/or different categories than are shown in FIG. 3, and/or each category may include more, fewer, and/or different types of information than are shown in FIG. 3.

Driving behavior information 152 may include acceleration patterns, braking patterns, weaving patterns, ADAS usage patterns, compliance with speed limits, and/or compliance with driver limitations. For example, driving behaviors identification unit 80, or another unit of data analysis unit 74, may determine acceleration, braking, weaving patterns, and ADAS usage patterns by analyzing acceleration, braking, weaving data, and ADAS data from operational data 102 of FIG. 2 over a period of time, and/or analyzing historical data 78.

As yet another example, driving behaviors identification unit 80, or another unit of data analysis unit 74, may determine compliance with speed limits (e.g., a number of times in a particular time period that the posted speed limit is exceeded by more than 5 miles per hour, a maximum amount or percentage by which speed deviates below or above a posted speed limit in a particular time period, etc.) using speed data from operational data 102 (or using acceleration data of operational data 102 to determine speed), and speed limit data from third party data 114, of FIG. 2.

Driving behaviors identification unit 80, or another unit of data analysis unit 74, may determine compliance with driver-specific limitations using one or more types of data within operational data 102 of FIG. 2, one or more types of data within sensor data 104 of FIG. 2, and driver limitation data from third party data 114 of FIG. 2. For example, driving behaviors identification unit 80, or another unit of data analysis unit 74, may use data from external sensor 30 and speed subsystem 42 of FIG. 1 to determine one or more metrics indicating how closely an operator follows other vehicles ("tailgates") in relation to his or her speed due to an operator-specific limitation. Driving behaviors identification unit 80, or another unit of data analysis unit 74, may determine from the third party server 18 of FIG. 1 (e.g., a department of transportation within a state) or from the operator-provided data (e.g., driver limitations data) that he or she has a particular level of vision impairment (e.g., shortsightedness or poor night vision), motor skill impairment (e.g., due to a handicap or injury), and/or other medical conditions and/or physical characteristics that may limit how he or she can safely operate a vehicle. Thereafter, driving behaviors identification unit 80 may determine whether the operator tends to follow other vehicles at a "safe" distance, in light of known correlations stored in one or more memory units (e.g., memory 72) between drivers with similar limitations and the occurrence of vehicle collisions. Other driving behaviors (e.g., braking patterns, weaving patterns, windshield wiper usage, etc.) may also, or instead, be analyzed in connection with any driver-specific limitations.

In some implementations, one or more of the types of information in driving behavior information 152 may be further subdivided based upon various conditions (e.g., traffic, weather conditions) in order to determine whether driving behavior changes based upon changing conditions. Specifically, driving behaviors identification unit 80, or another unit of data analysis unit 74, may correlate the sensor data 104 of FIG. 2 to the speed, acceleration, braking, weaving, ADAS data and other data from operational data 102 of FIG. 2 over a period of time. For example, some or all of the driving behavior information 152 may be associated with different weather conditions, different traffic conditions, different times and/or lighting conditions (e.g., day, evening, night, etc.), different vehicle models (e.g., if profile information is separately determined for multiple vehicles of an operator), different types of roads/areas, different enabled ADAS features, and so on. Thus, for instance, driving behavior information 152 may include compliance with speed limits (e.g., an indication of how often and/or long the operator exceeds the speed limit by a pre-determined threshold amount) for heavy traffic, and also compliance with speed limits for light and/or moderate traffic.

As another example, driving behavior information 152 may include compliance with speed limits in school zones, as well as compliance with speed limits on interstate roads. As yet another example, driving behavior information 152 may include acceleration, braking, weaving, and ADAS usage patterns in clear weather, rainy, foggy, and/or snowy/icy weather, heavy traffic, light traffic, etc.

In some embodiments, driving behaviors identification unit 80, or another unit of data analysis unit 74, may correlate the sensor data 104 of FIG. 2 to the speed, acceleration, braking, weaving, ADAS data and other data from operational data 102 of FIG. 2, as well as to valid and false positive ADAS alerts determined by data analysis unit 74, over a period of time. For example, upon analysis of the vehicle data (e.g., sensor data 104 and operational data 102) from vehicle 12 via interface 60 and correlation of such data to valid and false positive ADAS alerts determined by data analysis unit 74, if the driving behavior identification unit 80 determines that a first set of acceleration, braking, and/or weaving data (e.g., from operational data 102) of the operator of vehicle 12 associated with heavy traffic (e.g., sensor data 104) shows a change in data when compared to vehicle data (e.g., from operational data 102, such as data generated by subsystems 40, 42, 44, and/or 46 of ADAS 22) that caused a valid ADAS alert to be generated at the vehicle 12, driving behavior identification unit 80 may determine that the operator exhibited safe, risk averse, or responsive driving behavior by abiding by the valid ADAS alert.

If the driving behavior identification unit 80 determines that a second set of acceleration, braking, and/or weaving data (e.g., from operational data 102) of the operator of vehicle 12 associated with light traffic (e.g., sensor data 104) does not show a change in data when compared to vehicle data (e.g., from operational data 102, such as data generated by subsystems 40, 42, 44, and/or 46 of ADAS 22) that caused a valid ADAS alert to be generated at the vehicle 12, driving behavior identification unit 80 may determine that the operator exhibited unsafe driving behavior by not following a valid ADAS alert. Based upon a comparison of driving behaviors associated with the first and second sets, driving behavior identification unit 80 may also determine that the operator exhibits safer driving behavior when in heavier traffic.

Feature usage information 154 may include forward collision warning feature usage, a blind spot indication feature usage, a cruise control feature usage, a lane departure warning feature usage, automatic high beam usage, and/or other ADAS feature usage, and may also be indicative of how often the operator uses one or more of the aforementioned features. The aforementioned usages may be road condition, weather and/or time-of-day dependent. For example, driving behaviors identification unit 80 or another unit of data analysis unit 74 may use ADAS data or other data from operational data 102, traffic condition data from sensor data 104, weather condition data from sensor data 104, and/or third party data 114 (e.g., road conditions data) to determine how often (and/or for how long) the operator uses any one or more features of ADAS 22 in various different road, traffic, and/or weather conditions. For illustrative purposes, feature usage information 154 is shown as its own distinct profile information category. However, feature usage information 154 may also be a subset or subdivision of driving behavior 152, namely, ADAS usage patterns.

ADAS alert responsiveness information 156 may include data corresponding to driver responsiveness to both false positive and valid ADAS alerts (e.g., forward collision warning, a blind spot indication warning, a cruise control warning, a lane departure warning, an automatic high beam warning, etc.). Particularly, alert responsiveness information 156 may include and/or utilize data such as diagnostic data 106 (e.g., data indicative of whether particular feature(s) of ADAS 22 are operational or inoperable/malfunctioning, data indicative of whether alerts from ADAS 22 were indicated to the operator and at what time, data indicative of whether the alerts from ADAS 22 were deactivated and at what time), and/or operational data 102 (e.g., data indicative of whether ADAS has been engaged in the vehicle, data indicative of operational data 102 that caused activation of the alerts from ADAS 22, data indicative of operational data 102 that caused deactivation of the alerts from ADAS 22) and possibly data from a third party such as data from third party server 18 of FIG. 1, to determine driver responsiveness to ADAS alerts.

Figure 4:
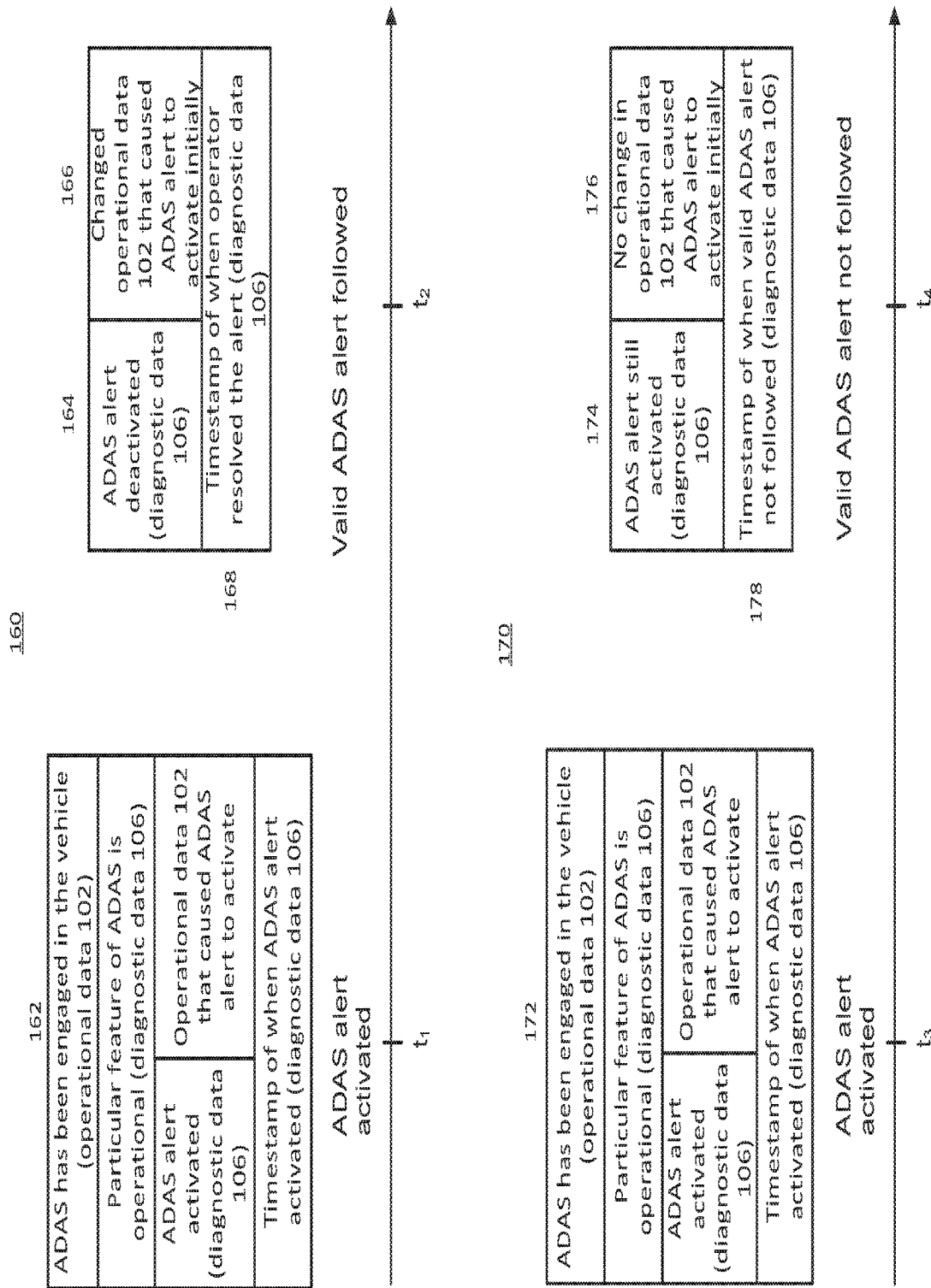
FIG. 4 depicts an exemplary scenario in which an operator followed a valid ADAS alert.

For example, as shown in FIG. 4, historical driving data may show that drivers followed or responded to a valid ADAS alert, as described in scenario 160. After determining that data 162 suggests that a valid ADAS alert was indicated to the operators, driving behaviors identification unit 80, or another unit of data analysis unit 74, may determine that the ADAS alert has been deactivated (164) at a timestamp (168) subsequent to the timestamp of data 162 (e.g., the ADAS alert has been deactivated after a pre-determinable amount of time that has elapsed since the timestamp of data 162). Alternatively, driving behaviors identification unit 80 or another unit of data analysis unit 74 may determine that the operational data 102 that caused the ADAS alert to be indicated to the operators in the first place changed (166), or did not remain consistent, at a timestamp (168) subsequent to the timestamp of data 162 (e.g., the operational data 102 changed after a pre-determinable amount of time that has elapsed since the timestamp of data 162). Data analysis unit 74, by comparing data 162 with data 164, 166, and 168 of scenario 160, along with measurements data associated with the operator of vehicle 12, may adjust the likelihood level of the operator of vehicle 12.

Similarly, as shown in FIG. 4, historical driving data may show that the drivers did not follow a valid ADAS alert, as described in scenario 170. After determining that data 172 suggests that a valid ADAS alert was indicated to the operators, driving behaviors identification unit 80 or another unit of data analysis unit 74 may determine that the ADAS alert still remains activated (174) at a timestamp (178) subsequent to the timestamp of data 172 (e.g., the ADAS alert still remains activated after a pre-determinable amount of time that has elapsed since the timestamp of data 172). Alternatively, driving behaviors identification unit 80 or another unit of data analysis unit 74 may determine that the operational data 102 that caused the ADAS alert to be indicated to the operators in the first place did not change (176), or remained consistent, at a timestamp (178) subsequent to the timestamp of data 172 (e.g., the operational data 102 did not change after a pre-determinable amount of time that has elapsed since the timestamp of data 172). Data analysis unit 74, by comparing data 172 with data 174, 176, and 178 of scenario 170, along with measurements data associated with the operator of vehicle 12, may adjust the likelihood level of the operator of vehicle 12.

Figure 5:
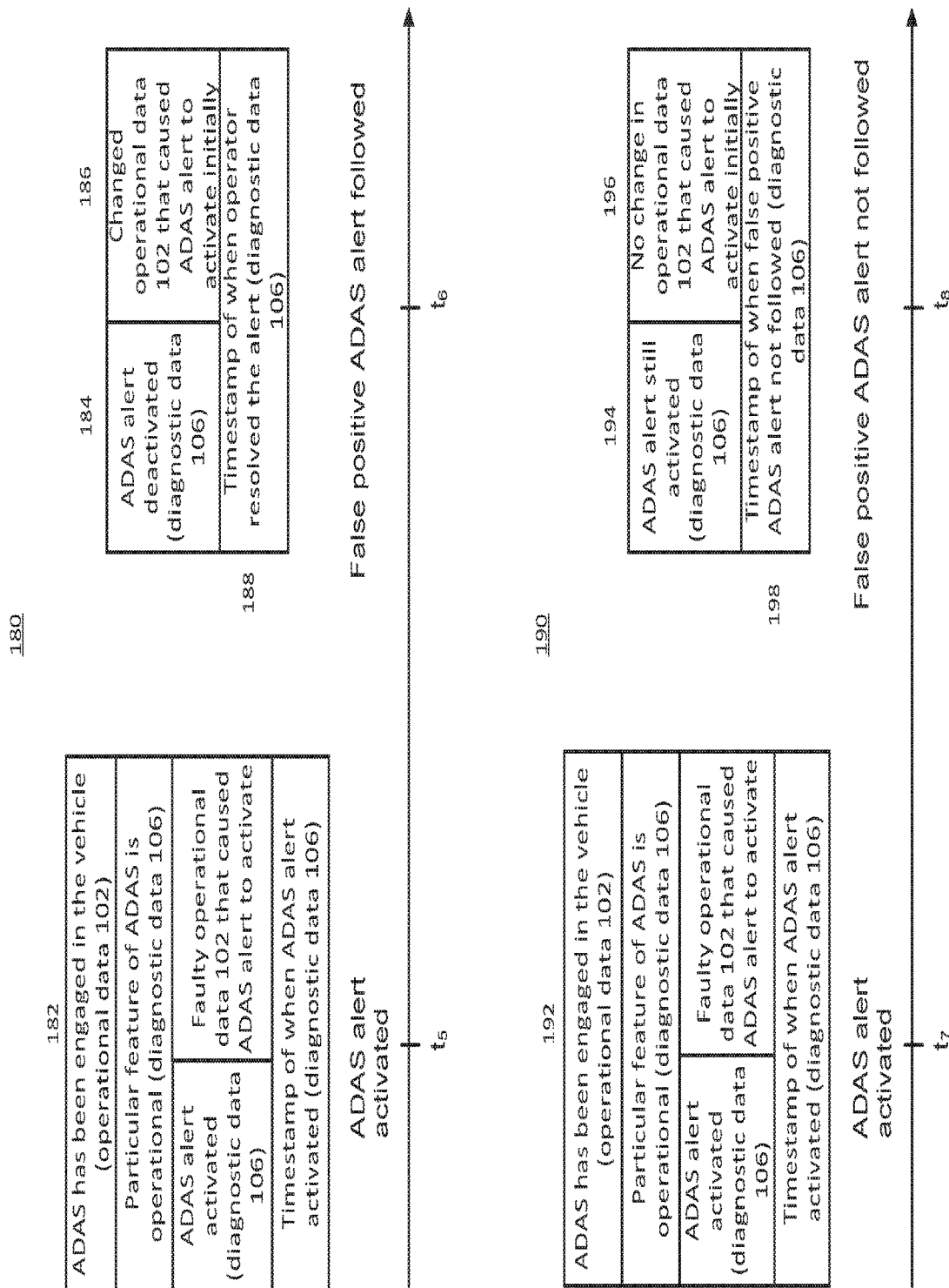
FIG. 5 depicts an exemplary scenario in which a false positive ADAS alert was issued.

As another example, as shown in FIG. 5, driving behaviors identification unit 80, or another unit of data analysis unit 74, may determine that the operator followed or responded to a false positive ADAS alert, as described in scenario 180. After determining that data 182 suggests that a false positive ADAS alert was indicated to the operator, driving behaviors identification unit 80, or another unit of data analysis unit 74, may determine that the ADAS alert has been deactivated (184) at a timestamp (188) subsequent to the timestamp of data 182 (e.g., the ADAS alert has been deactivated after a pre-determinable amount of time that has elapsed since the timestamp of data 182). Alternatively, driving behaviors identification unit 80, or another unit of data analysis unit 74, may determine that the operational data 102 that caused the ADAS alert to be indicated to the operator in the first place changed (186), or did not remain consistent, at a timestamp (188) subsequent to the timestamp of data 182 (e.g., the operational data 102 changed after a pre-determinable amount of time that has elapsed since the timestamp of data 172) As will be further described below, data analysis unit 74, by comparing data 182 with data 184, 186, and 188 of scenario 180, along with measurements data associated with the operator of vehicle 12, may adjust the likelihood level of the operator of vehicle 12.

Similarly, as shown in FIG. 5, historical driving data may show that the drivers did not follow a false positive ADAS alert, as described in scenario 190. After determining that data 192 suggests that a false positive ADAS alert was indicated to the operators, driving behaviors identification unit 80, or another unit of data analysis unit 74, may determine that the ADAS alert still remains activated (194) at a timestamp (198) subsequent to the timestamp of data 192 (e.g., the ADAS alert still remains activated after a pre-determinable amount of time that has elapsed since the timestamp of data 192). Alternatively, driving behaviors identification unit 80, or another unit of data analysis unit 74, may determine that the operational data 102 that caused the ADAS alert to be indicated to the operators in the first place did not change (196), or remained consistent, at a timestamp (198) subsequent to the timestamp of data 192 (e.g., the operational data 102 did not change after a pre-determinable amount of time that has elapsed since the timestamp of data 192). As will be further described below, data analysis unit 74, by comparing data 192 with data 194, 196, and 198 of scenario 190, along with measurements data associated with the operator of vehicle 12, may adjust the likelihood level of the operator of vehicle 12.

Referring back to FIG. 3, driver state information 158 may include driver attentiveness and/or driver emotional state. For example, driving behaviors identification unit 80 or another unit of data analysis unit 74 may determine how attentive an operator is (e.g., gaze direction, how often he or she checks instruments and/or the rearview mirror, how often he or she checks an ADAS alert, etc.) by using image recognition and/or other image processing techniques to process driver image data from sensor data 104 of FIG. 2. As another example, driving behaviors identification unit 80 or another unit of data analysis unit 74 may determine an operator's emotional state and/or level of attentiveness (e.g., calm, angry, distracted, etc.) by using image recognition and/or other image processing techniques to process driver image data from sensor data 104. In some embodiments, driving behaviors identification unit 80 or another unit of data analysis unit 74 may correlate the operator state information 158 with the sensor data 104 and operational data 102 of FIG. 2, as well as to valid and false positive ADAS alerts determined by data analysis unit 74, over a period of time, to identify driving behavior and/or generate/modify driver profiles.

Some or all of the types of profile information discussed above, and/or other types of information, may be used (e.g., by profile generation/update unit 82 of FIG. 1) to populate and/or update one or more profile fields of a profile for a particular driver. For example, profile generation/update unit 82 may use some or all types of profile information within driving behavior information 152, feature usage information 154, alert responsiveness information 156, and/or driver state information 158 as profile field values, and/or also incorporate the likelihood level based upon some or all types of driving behavior information 152, feature usage information 154, alert responsiveness information 156, and/or driver state information 158. Therefore, such a profile may provide various driving behaviors of an operator, such as the operator's preferred ADAS features, responsiveness to the preferred ADAS features, etc.

When ADAS likelihood indicator 88 calculates the likelihood level, various profile information types and/or categories may be more heavily weighted than others. For example, responsiveness to ADAS alerts may be weighted more heavily than weather-specific windshield wiper usage. Generally, specific types of profile information may be used to determine the likelihood level if it is known a priori (e.g., from past correlations with driver actions) or believed that those types of information are probative of how trustworthy or responsible the operator is.

The likelihood level may be determined using, in addition to historical driving data, various types of information shown in FIG. 3, and also using information about the operator and/or vehicle (e.g., data included in driver-provided data 112 of FIG. 2, such as age, gender, education level, profession, vehicle model, etc.). As just one more specific example, the likelihood level or other information in an operator profile may be based at least in part upon a joint consideration of (1) a color of the vehicle, (2) times of day when the vehicle is driven, (3) weather in which the vehicle is driven (e.g., in view of the assumption or known correlation that vehicles of certain colors may be less visible at certain times of day and/or in certain types of weather), and (4) ADAS alert responsiveness (e.g., from information 156).

Exemplary Use Cases for Driver Profiles

Once an operator profile is determined (e.g., generated or updated using some or all of the profile information shown in FIG. 2, FIG. 3, and/or other types of information), one or more fields of the profile may be used in any of a number of different ways, depending upon the embodiment.

In some embodiments, the operator profile may be used in connection with driver education and/or licensing. For example, situation-specific driving behaviors reflected in the profile (e.g., driving behavior in specific types of weather and/or traffic) may be used by a government entity for licensing or re-licensing of drivers. As another example, driver profiles may be used to rate how well or responsibly a driving instructor drives, and/or how well or responsibly his or her students drive (with the latter ratings potentially also being used to rate the instructor). In embodiments such as these, driver profile information may be transmitted to a remote computing system (e.g., third party server 18 of FIG. 1) for display to one or more individuals positioned to act upon the information (e.g., to approve the grant of a license, or provide a performance review to an instructor, etc.)

In still other embodiments, driver profiles may be used to adjust costs for usage-based insurance and/or other insurance premiums. For example, an underwriting department of an insurer may use driver profile information to gauge risk and set appropriate premiums. Alternatively, the costs of usage-based insurance may be automatically calculated by a computing system (e.g., computer system 16 of FIG. 1) based upon the operator profile information.

In still other embodiments, driver profiles may be used to influence resale values of vehicles. In particular, driver profile information indicative of how aggressively or conservatively the operator drove the vehicle may cause the value to go down or up, respectively. In certain embodiments such as these, driver profile information may be transmitted to a remote computing system (e.g., third party server 18 of FIG. 1, or a personal computing device of a potential buyer, etc.) for display to one or more individuals positioned to act upon the information (e.g., set the vehicle resale price, or buy the vehicle).

In still other embodiments, driver profiles may be used by fleet owners to provide rental vehicle discounts. For example, driver profile information may be transmitted to a remote computing system (e.g., third party server 18 of FIG. 1) for display to one or more individuals positioned to act upon the information (e.g., an agent who can apply the discount), or to cause the discount to be automatically applied to a rental fee.

In still other embodiments, driver profiles may be used by car sharing services to provide discounts. For example, driver profile information may be transmitted to a remote computing system (e.g., third party server 18 of FIG. 1) for display to one or more individuals positioned to act upon the information (e.g., an agent who can apply the discount), or to cause the discount to be automatically applied to a car share fee.

In still other embodiments, driver profiles may be used for other purposes, such as determining how a particular individual would likely care for, maintain, or be compatible with driving a vehicle (e.g., a rental vehicle with or without ADAS features, autonomous vehicle, etc.), estimating how long vehicle components (e.g., tires, brake pads, rotors, etc.) will last, and so on.

In some embodiments where driver profiles include likelihood levels (as discussed above), such likelihood levels may be used in a number of different situations where the operator's trustworthiness or driving behavior is important. For example, the likelihood levels may be used by an insurance entity to adjust a price to risk model associated with the operator based upon the operator's likelihood level. In embodiments such as these, likelihood levels may be transmitted to a remote computing system (e.g., third party server 18 of FIG. 1) for display to one or more individuals positioned to act upon the information (e.g., authorize price to risk model adjustment), and/or for automated adjustment of the price to risk model.

As another example, the likelihood levels may be used by a credit rating entity to raise or lower the operator's credit score. In embodiments such as these, likelihood levels may be transmitted to a remote computing system (e.g., third party server 18 of FIG. 1) for display to one or more individuals positioned to act upon the information (e.g., authorize a credit score change), and/or for automated adjustment of the credit score.

As another example, the likelihood levels may be submitted to an employer in connection with a resume and/or application for a particular job. A likelihood level may be especially pertinent to jobs that involve frequent driving, such as an operator for restaurant delivery, a ride-sharing driver, etc. In embodiments such as these, a likelihood level may be transmitted to a remote computing system (e.g., third party server 18 of FIG. 1) for display to one or more individuals positioned to act upon the information (e.g., hire the individual associated with the likelihood level).

As yet another example, the likelihood level may be used to enable "IOUs" with particular service providers (e.g., a taxi service, ride-sharing service, etc.). In embodiments such as these, likelihood levels of driver profiles may be transmitted to a remote computing system (e.g., third party server 18 of FIG. 1), after which the computing system may indicate to one or more agents of the service provider that an IOU may be accepted from the individual.

In another embodiment, likelihood levels need not be transmitted to a remote computing system. The data analysis unit 74 or data processing unit 54 themselves may adjust the price to risk model, credit rating, insurance rating, review, permanent credit, or temporary credit associated with the operator based upon at least the portion of the operator profile.

Figure 6:
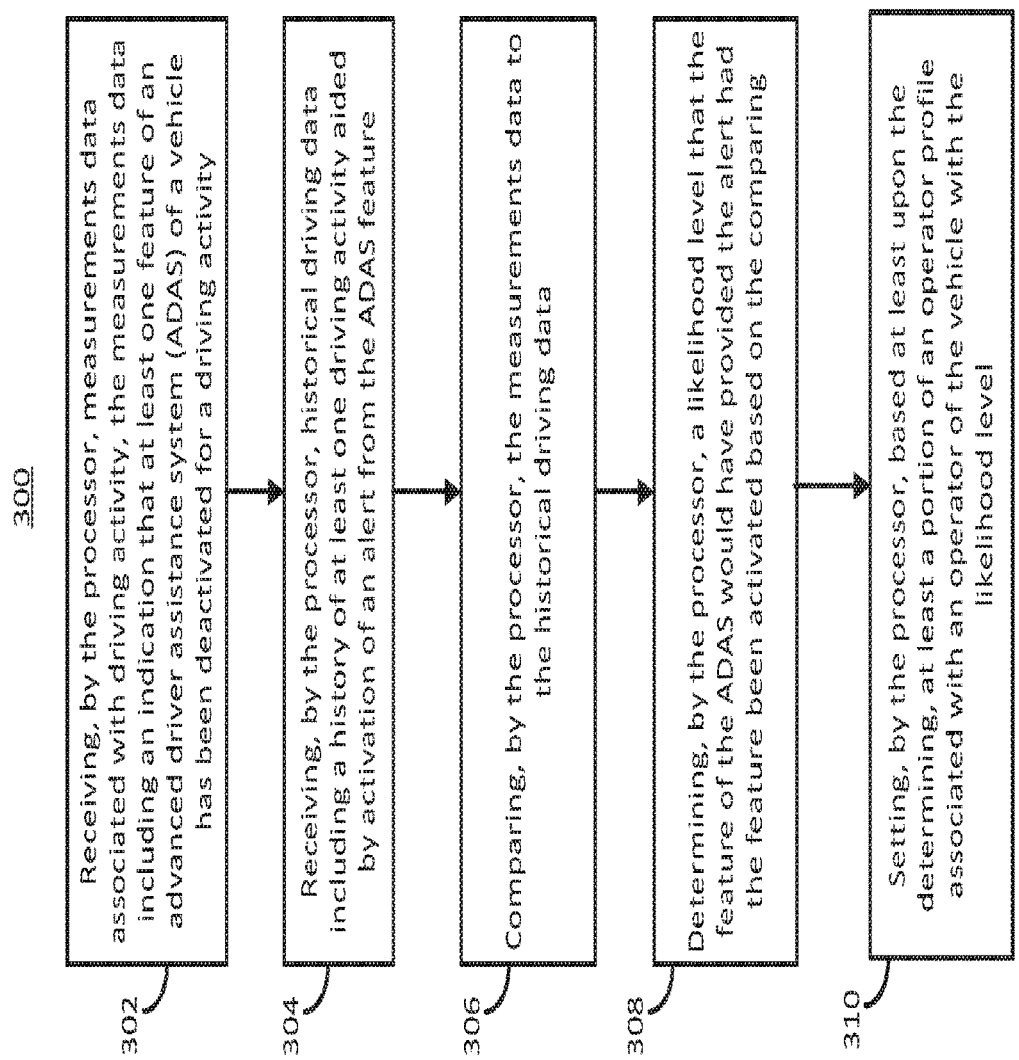
FIG. 6 is a flow diagram of an exemplary computer-implemented method for detecting and acting upon deactivated vehicle components.

Exemplary Computer-Implemented Method for Detecting and Acting Upon Deactivated Vehicle Components FIG. 6 is a flow diagram of an exemplary computer-implemented method 300 for detecting and acting upon deactivated vehicle components, particularly deactivated ADAS features. The method 300 may be implemented by data analysis unit 74 or data processing unit 54 of FIG. 1, for example.

In the method 300, data analysis unit 74 or data processing unit 54 may receive and/or analyze measurements data (i.e., vehicle data) generated by subsystems 40, 42, 44, and/or 46 of ADAS 22 at the time of the driving activity (block 302), particularly when at least one feature of an Advanced Driver Assistance System (ADAS) of vehicle 12 has been deactivated (e.g., ADAS feature has been turned off, ADAS feature malfunctioned or is inoperable or malfunctioning, driver did not drive a vehicle with ADAS feature installed within the vehicle, etc.) for the driving activity. The measurements data may be operational data 102 or diagnostic data 106, as described in FIG. 2, from either vehicle 12 (e.g., from interface 60 of on-board system 14, as discussed above) or a mobile electronic device of an operator or passenger. The measurements data may also be indicative of speeding, accelerating, braking, lane shifting, weaving patterns, etc. For example, it may be determined that operational data 102, specifically, ADAS data, shows that ADAS 22 has not been engaged at a particular time, and/or diagnostic data 106 shows data indicating which feature(s) of ADAS 22 are operational or malfunctioning/inoperable.

Data analysis unit 74 or data processing unit 54 may track and/or record the time as to when the feature of ADAS 22 of the vehicle 12 has been deactivated (or become inoperable). Data analysis unit 74 or data processing unit 54 may track and/or record operational data 102, sensor data 104, diagnostic data 106, location data 110, driver-provided data 112, and/or third party data 114, as described in FIG. 2, at the time as to when the feature of ADAS 22 of the vehicle 12 had been deactivated (or become inoperable). The time may be determined as a specific time (e.g., corresponding to a time stamp), or a time range (e.g., on or before a particular date), for example.

In one embodiment where the method 300 is implemented by a server remote from the vehicle (e.g., a server of computer system 16 of FIG. 1), the vehicle data may be received at the server, from the on-board system, via a wireless link (e.g., via network 20 of FIG. 1). For example, if method 300 has detected that a lane departure warning feature of ADAS 22 has been deactivated (or is inoperable or malfunctioning), method 300 may receive measurements data associated with the driving activity, such as operational data 102. (e.g., whether a turn signal has been activated at the time of the driving activity, steering data), sensor data 104 (e.g., driver images of whether a vehicle is straddling a lane at the time of the driving activity), diagnostic data 106 (e.g., whether the software version of the lane departure warning feature is up to date at the time of the driving activity), location data 110 (e.g., where the vehicle was located at the time of the driving activity), driver-provided data 112 (e.g., vehicle model), and/or third party data 114 (e.g., road conditions which may indicate whether the lane has been clearly indicated with visible lane markings).

The method may then receive historical driving data stored in a database (e.g., historical driving data database 78) (block 304). The historical driving data may include a history of at least one driving activity aided by activation of an alert from the ADAS feature that has been deactivated (or is inoperable or malfunctioning) for the operator of vehicle 12. It may contain records of measurement data that have caused ADAS alerts to have been generated in the past.

The method 300 may then compare the measurement data with the historical driving data (block 306). The historical driving data, which may be associated with the operator, to other drivers, or both, may contain records of driving data (e.g., operational data 102, sensor data 104, diagnostic data 106, location data 110, driver-provided data 112, and/or third party data 114 of FIG. 2) that have caused ADAS alerts to be generated in the past. For example, historical driving data may show that for the location where the vehicle was located at the time of the driving activity, 95% of other vehicles (and/or vehicle 12) were in driving situations (e.g., sensor data 104 showed images of vehicles straddling a lane) that caused ADAS alerts to be generated in the past. As another example, historical driving data may show that operational data 102 of other vehicles (and/or vehicle 12) showed steering data similar to measurements data associated with the driving activity of vehicle 12, ADAS data that indicated that ADAS had been engaged in other vehicles (and/or vehicle 12) for previous driving activities, and that diagnostic data 106 showed that ADAS indicated ADAS alerts to other drivers (and/or vehicle 12) for previous driving activities.

In such examples, because comparison of the measurement data with the historical driving data shows a consistent correlation, the comparison may represent a finding that, if historical driving data caused an ADAS alert to have been generated in the past, the measurement data would have caused an ADAS alert at the time of the driving activity for vehicle 12.

In some embodiments, although not shown, the method 300 may select an operating parameter (i.e., one of the common operational data 102), so that at block 306, the method 300 may then compare the measurements data associated with the operating parameter with the historical driving data associated with the same operating parameter to determine whether the ADAS feature would have provided an alert had the ADAS feature been activated (or operable or functioning as intended).

For example, in order to determine whether the lane departure warning feature of the ADAS 22 would have provided a lane departure alert had the lane departure warning feature been activated (or operable or in working condition), the method 300 may select an operating parameter, such as location of operational data 102, and subsequently compare measurements data associated with location of the driving activity when the operator lane departure warning feature had been deactivated (or become inoperable or malfunctioning) (e.g., the operator of vehicle 12 was at 41.8789° N, 87.6359° W when the operator lane departure warning feature had been deactivated) with the historical driving data associated with the same location (e.g., profile for the operator of the vehicle 12, or profiles of other drivers for other vehicles, indicated that the lane departure alert at 41 8789° N, 87.6359° W was activated (or issued an alert as intended) numerous times when the lane departure warning feature was activated (or operable or functioning as intended) in the past in the vehicle 12 or other vehicles).

The method 300 may then determine a likelihood level that the feature of the ADAS would have provided the alert had the feature been activated (or operable) based upon the comparing (block 308). The method 300 may determine a high likelihood that the feature of the ADAS would have provided an alert had the feature been activated (or operable) based upon a consistent correlation between measurement data and historical driving data, for example.

For example, as a result of a determined consistent correlation subsequent to comparing measurements data associated with location of the driving activity when the operator lane departure warning feature had been deactivated (or malfunctioning, or inoperable) (e.g., the operator of vehicle 12 was at 41.8789° N, 87.6359° W when the operator lane departure warning feature had been deactivated) with the historical driving data associated with the same location (e.g., profile for the operator of the vehicle 12, or profiles of other drivers for other vehicles, indicated that the lane departure alert at 41.8789° N, 87.6359° W was activated numerous times when the lane departure warning feature was activated (or operable) in the past in the vehicle 12 or other vehicles), the method 300 may determine a high likelihood that the operator lane departure warning feature would have provided an alert had the lane departure warning feature been activated (or operable) at vehicle 12. In some embodiments, the greater the number of times when the lane departure warning feature was activated (or worked as intended and issued alerts) in the past in the vehicle 12 or other vehicles, the greater the increase in the likelihood level.

Based upon the determination of a likelihood level at block 308, an operator profile associated with the operator (e.g., in driver profiles database 76 of FIG. 1) may be set or adjusted to reflect the determination of a likelihood level associated with a particular driving activity (block 310). Block 310 may correspond to the generation of a new driver profile and/or new driver profile fields, or to the update of an existing driver profile.

In some embodiments, the operator profile associated with the operator may be set or adjusted to reflect additional information associated with a particular driving activity that is not necessarily associated with the alert of the ADAS, in addition to the comparison as depicted in block 306. For example, although not shown, method 300 may receive measurements data such as sensor data 104 (e.g., data indicating the number of passengers in the vehicle), driver-provided data 112 (e.g., age, gender, education level, profession) and/or third party data 114 (e.g., driver limitations), and the operator profile associated with the operator may be set or adjusted to reflect such data. For example, it may be determined that an operator of a vehicle has one or more limitations specific to a medical or physical condition, such as impaired vision (e.g., shortsightedness or poor night vision), that the operator has impaired motor skills (e.g., causing slow reaction times), that the operator is driving alone or has passengers in the vehicle, etc. Method 300 may receive such data after requesting one or more records from a remote server via a network (e.g., from third party server 18 of FIG. 1 via network 20), for example.

In some embodiments, although not shown, the method 300 may transmit, via data analysis unit 74 or data processing unit 54, the operator profile (or a portion thereof) to an entity. The entity may be an entity (e.g., insurance institution) that adjusts a price to risk model associated with the operator based upon the profile or profile portion, an entity (e.g., financial institution) that adjusts a credit rating associated with the operator based upon the profile or profile portion, an entity (e.g., an insurer) that adjusts an insurance rating associated with the operator based upon the profile or profile portion, an entity (e.g., an employer) that reviews the profile or profile portion in connection with a job sought by the operator, or an entity (e.g., a rental vehicle company, taxi service, etc.) that offers a permanent or temporary credit (e.g., a discount or IOU), in connection with a good or service offered by the entity based upon the profile or profile portion, for example. Generally, such ratings may change depending on the likelihood level. Such ratings may also adjust based upon additional information associated with a particular driving activity that is not necessarily associated with the alert of the ADAS, such as driver-provided data 112 (e.g., age, gender, education level, profession) and/or third party data 114 (e.g., driver limitations).

In some embodiments, although not shown, the method 300 may adjust, via data analysis unit 74 or data processing unit 54, a price to risk model, a credit rating, an insurance rating, a review, a permanent credit, or a temporary credit associated with the operator based upon the operator profile.

In some embodiments, although not shown, the method 300 may transmit, via data analysis unit 74 or data processing unit 54, the operator profile (or a portion thereof) to a remote mobile electronic device, such as a smartphone belonging to the operator of vehicle 12. The smartphone may be configured to display the operator profile. In other embodiments, although not shown, the method 300 may generate an alert in response to determining the likelihood level that the feature of the ADAS would have provided the alert had the feature been activated (or operable). The alert may include a recommendation to activate the feature of the ADAS. Upon transmitting, via data analysis unit 74 or data processing unit 54, the alert to the remote mobile electronic device, such as a smartphone belonging to the operator of vehicle 12, the operator of vehicle 12 may be put on notice as to information pertaining to the deactivated ADAS feature of vehicle 12. In other embodiments, the alert may be transmitted to a display (not shown) of on-board system 14 for display.

The method 300 may include additional, less, or alternate actions, including those discussed elsewhere herein.

In another aspect, a computer-implemented method for detecting and acting upon deactivated vehicle components may be provided. The method may include, via one or more processors, servers, sensors, and/or transceivers: (1) receiving measurements data associated with driving activity, the measurements data including an indication that at least one feature of an Advanced Driver Assistance System (ADAS) of a vehicle has been deactivated for a driving activity; (2) comparing the measurements data to baseline data associated with ADAS activation; (3) determining a likelihood level that the feature of the ADAS would have provided the alert had the feature been activated based upon the comparing; and/or (4) setting based at least upon the determining, at least a portion of an operator or risk profile associated with an operator of the vehicle with the likelihood level. The method may include additional, less, or alternate actions, including those discussed elsewhere herein.

In another aspect, a computer system configured to determine, detect, and/or act upon deactivated vehicle components may be provided. The system may include one or more processors, servers, sensors, and/or transceivers configured to: (1) receive measurements data associated with driving activity, the measurements data including an indication that at least one feature of an Advanced Driver Assistance System (ADAS) of a vehicle has been deactivated for a driving activity; (2) compare the measurements data to baseline data associated with ADAS activation; (3) determine a likelihood level that the feature of the ADAS would have provided the alert had the feature been activated based upon the comparing; and/or (4) set based at least upon the determining, at least a portion of an operator or risk profile associated with an operator of the vehicle with the likelihood level. The system may include additional, less, or alternate functionality, including that discussed elsewhere herein.

In another aspect, a computer-implemented method for detecting and acting upon deactivated or disengaged vehicle components may be provided. The method may include, via one or more processors, servers, sensors, and/or transceivers: (1) receiving measurements data associated with driving activity, the measurements data including an indication that at least one feature of an Advanced Driver Assistance System (ADAS) of a vehicle has been disengaged during or for a driving activity; (2) receiving historical driving data including a history of at least one driving activity aided by activation of an alert from the ADAS feature; (3) comparing the measurements data to the historical driving data; (4) determining a likelihood level that the feature of the ADAS would have provided the alert had the feature been engaged based upon the comparing; and/or (5) setting based at least upon the determining, at least a portion of an operator profile associated with an operator of the vehicle with the likelihood level. The system may include additional, less, or alternate actions, including those discussed elsewhere herein.

In another aspect, a computer-implemented method for detecting and acting upon deactivated or inoperable vehicle components may be provided. The method may include, via one or more processors, servers, sensors, and/or transceivers: (1) receiving measurements data associated with driving activity, the measurements data including an indication that at least one feature of an Advanced Driver Assistance System (ADAS) of a vehicle has been inoperable or malfunctioning during or for a driving activity; (2) receiving historical driving data including a history of at least one driving activity aided by activation of an alert from the ADAS feature; (3) comparing the measurements data to the historical driving data; (4) determining a likelihood level that the feature of the ADAS would have provided the alert had the feature been operable or functioning as intended based upon the comparing; and/or (5) setting based at least upon the determining, at least a portion of an operator profile associated with an operator of the vehicle with the likelihood level. The method may include additional, less, or alternate actions, including those discussed elsewhere herein.

In another aspect, a computer system configured to detect and/or act upon deactivated or disengaged vehicle components may be provided. The system may include one or more processors, servers, sensors, and/or transceivers configured to: (1) receive measurements data associated with driving activity, the measurements data including an indication that at least one feature of an Advanced Driver Assistance System (ADAS) of a vehicle has been disengaged during or for a driving activity; (2) receive historical driving data including a history of at least one driving activity aided by activation of an alert from the ADAS feature; (3) compare the measurements data to the historical driving data; (4) determine a likelihood level that the feature of the ADAS would have provided the alert had the feature been engaged based upon the comparing; and/or (5) set based at least upon the determining, at least a portion of an operator profile associated with an operator of the vehicle with the likelihood level. The system may include additional, less, or alternate functionality, including that discussed elsewhere herein.

In another aspect, a computer system configured to detect and/or act upon deactivated or inoperable vehicle components may be provided. The system may include one or more processors, sensors, transceivers, and/or servers configured to: (1) receiving measurements data associated with driving activity, the measurements data including an indication that at least one feature of an Advanced Driver Assistance System (ADAS) of a vehicle has been inoperable or malfunctioning during or for a driving activity; (2) receiving historical driving data including a history of at least one driving activity aided by activation of an alert from the ADAS feature; (3) comparing the measurements data to the historical driving data; (4) determining a likelihood level that the feature of the ADAS would have provided the alert had the feature been operable or functioning as intended based upon the comparing; and/or (5) setting based at least upon the determining, at least a portion of an operator profile associated with an operator of the vehicle with the likelihood level. The system may include additional, less, or alternate functionality, including that discussed elsewhere herein.

Exemplary Computer System for Generating and/or Using Driver Profiles

Figure 7:
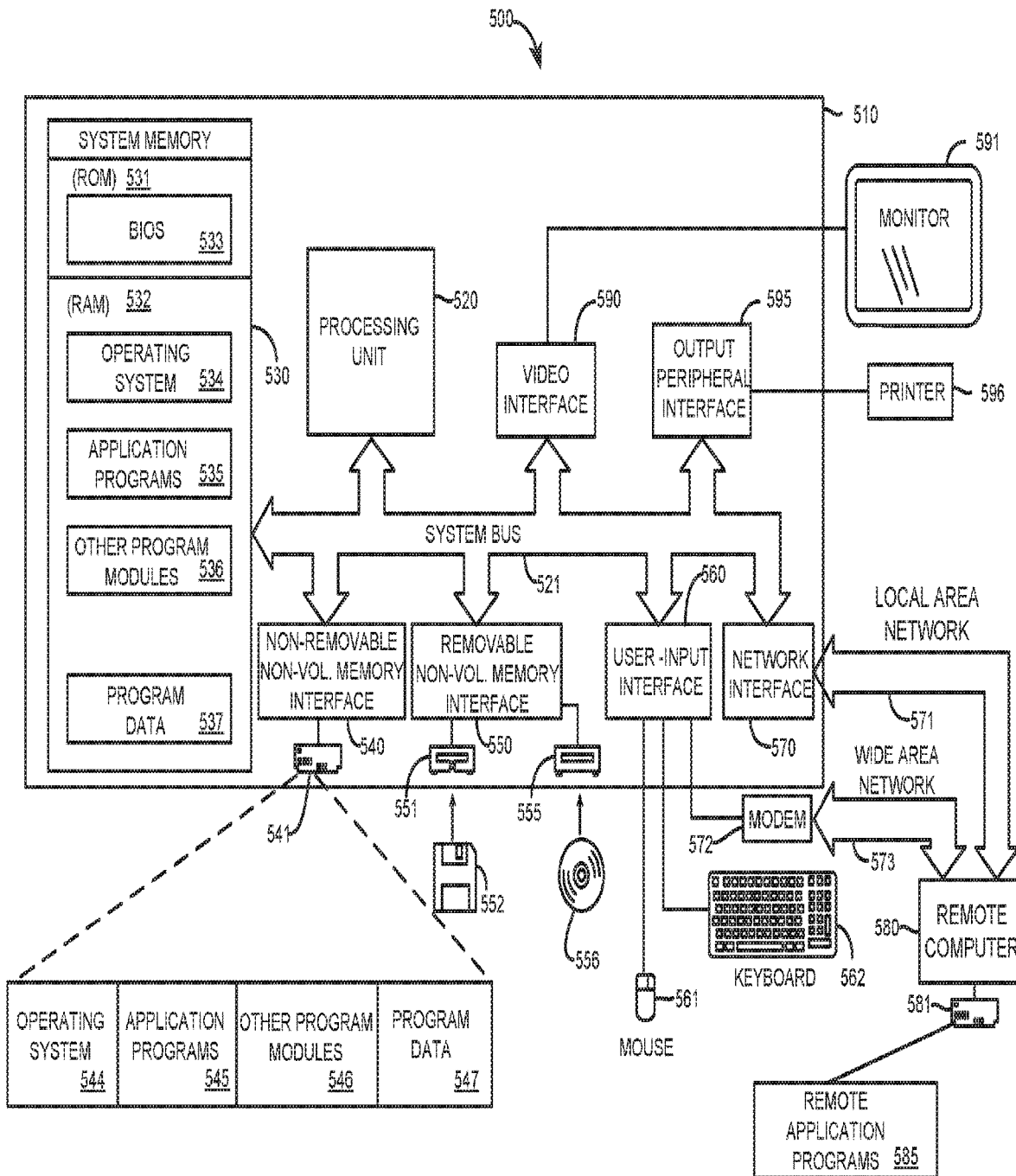
FIG. 7 is a block diagram of an exemplary computer system on which one or more of the embodiments described herein may be implemented.

FIG. 7 is a block diagram of an exemplary computer system 500 on which a computer-implemented method may operate in accordance with any of the embodiments described above. The computer system 500 of FIG. 7 includes a computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer-readable media. Computer-readable media can be any available media that can be accessed by computer 510 and includes both volatile and nonvolatile media, and both removable and non-removable media. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 530 includes computer storage media in the fom1 of volatile and/or nonvolatile memory such as ROM 531 and RAM 532. A basic input/output system (BIOS) 533, containing the basic routines that help to transfer information between elements within computer 510, such as during start-up, is typically stored in ROM 531. RAM 532 typically contains data and/or program modules that are immediately accessible to, and/or presently being operated on by, processing unit 520. By way of example, and not limitation, FIG. 7 illustrates operating system 534, application programs 535, other program modules 536, and program data 537.

The computer 510 may also include other removable/non-removable, volatile/nonvolatile computer storage media. By way of example only, FIG. 7 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 7 provide storage of computer-readable instructions, data structures, program modules and other data for the computer 510. In FIG. 7, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different reference numbers in FIG. 7 to illustrate that, at a minimum, they are different copies. A user may enter commands and information into the computer 510 through input devices such as a keyboard 562 and cursor control device 561, commonly referred to as a mouse, trackball or touch pad. A monitor 591 or other type of display device is also connected to the system bus 521 via an interface, such as a graphics controller 590. In addition to the monitor 591, computers may also include other peripheral output devices such as printer 596, which may be connected through an output peripheral interface 595.

The computer 510 may operate in a networked environment using logical connections to one or more remote computers, such as a remote computer 580. The remote computer 580 may be a persona! computer, a server, a router, a network PC, a peer device or other common network node, and typically includes many or all of the elements described above relative to the computer 510, although only a memory storage device 581 has been illustrated in FIG. 7. The logical connections depicted in FIG. 7 include a local area network (LAN) 571 and a wide area network (WAN) 573, but may also include other networks. Such networking environments are commonplace in hospitals, offices, enterprise-wide computer networks, intranets and the Internet.

When used in a LAN networking environment, the computer 510 is connected to the LAN 571 through a network interface or adapter 570. when used in a WAN networking environment, the computer 510 typically includes a modem 572 or other means for establishing communications over the WAN 573, such as the Internet. The modem 572, which may be internal or external, may be connected to the system bus 521 via the input interface 560, or via another appropriate mechanism. In a networked environment, program modules depicted relative to the computer 510, or portions thereof, may be stored in the remote memory storage device 581. By way of example, and not limitation, FIG. 7 illustrates remote application programs 585 as residing on memory device 581.

The communications connections 570, 572 allow the device to communicate with other devices. The communications connections 570, 572 are an example of communication media, as discussed above.

The methods of any of the embodiments described above (e.g., methods 300, 320, 340, 400, and/or 420) may be implemented wholly or in part using one or more computer systems such as the computer system 500 illustrated in FIG. 7. Referring generally to the embodiments of FIG. 1, for example, the computer 510 may be used as some or all of computer system 16, with the units 80, 82, and 88 being instructions that are a part of application programs 535 stored in RAM 532 and/or application programs 545 stored in hard disk drive 541. As another example, data from on-board system 14 may be received via a modem similar to the modem 572, which may in turn be coupled to a network similar to network 20 of FIG. 1.

Technical Advantages

The aspects described herein may be implemented as part of one or more computer components, such a server device, for example. Furthermore, the aspects described herein may be implemented within a computer network architecture implementing vehicle telematics technology, and may leverage that architecture and technology to obtain new and beneficial results not previously achieved. Thus, the aspects described herein address and solve issues of a technical nature that are necessarily rooted in computer technology.

For instance, aspects described herein may include analyzing various sources of vehicle data to identify certain driving behaviors that are not captured or recognized by conventional systems, such as capturing measurement data when ADAS has been deactivated, and comparing the measurement data to historical data when ADAS has been activated. Without the improvements provided by capturing such measurement data, the assessment of driving behavior as it pertains to ADAS-installed vehicles would be less complete, or may require much larger samples of telematics data to be collected and processed. Naturally, this would result in additional memory usage, processing resources, and/or time. Thus, aspects described herein address computer-related issues that are related to efficiency, processing, and storage metrics, such as consuming less power and/or memory, for example.

ADDITIONAL CONSIDERATIONS

With the foregoing, an insurance customer may opt-in to a rewards, insurance discount, or other type of program. After the insurance customer provides their affirmative consent, an insurance provider remote server may collect data from the customer's mobile device, smart vehicle, autonomous or semi-autonomous vehicle, smart home controller, or other smart devices-such as with the customer's permission or affirmative consent. The data collected may be related to smart or autonomous vehicle functionality, smart home functionality (or home occupant preferences or preference profiles), and/or insured assets before (and/or after) an insurance-related event, including those events discussed elsewhere herein. In return, those insured may receive discounts or insurance cost savings related to auto, home, renters, personal articles, mobile, and other types of insurance from the insurance provider.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for generating, modifying, and/or using driver profiles through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for configuring a vehicle component to assist with driving, the method comprising:
obtaining, by a processor and during a current trip of a vehicle, operating data indicating the vehicle component is deactivated;
obtaining, by the processor, historical driving data including historical driving activities performed while the vehicle component was activated;
determining, by the processor, and based on the operating data and the historical driving data, a likelihood value indicative of whether the vehicle component will be activated during the current trip;
generating, by the processor and based on the likelihood value, an alert to activate the vehicle component; and
transmitting, by the processor, the alert to a computing device associated with the vehicle, the alert causing the computing device to activate the vehicle component.

2. The computer-implemented method of claim 1, wherein the historical driving data comprises:
historical driving behaviors of a plurality of operators that caused activation of the vehicle component, and
historical reaction data of the plurality of operators in response to the activation of the vehicle component.

3. The computer-implemented method of claim 2, further comprising:
determining, by the processor, that the activation of the vehicle component caused at least one valid alert;
determining, by the processor and based on the historical reaction data, that the plurality of operators did not respond to the at least one valid alert; and
based on determining that the plurality of operators did not respond to the at least one valid alert, increasing, by the processor, the likelihood value.

4. The computer-implemented method of claim 2, further comprising:
determining, by the processor, that the activation of the vehicle component caused at least one false alert;
determining, by the processor and based on the historical reaction data, that the plurality of operators did not respond to the at least one false alert; and
based on determining that the plurality of operators did not respond to the at least one false alert, decreasing, by the processor, the likelihood value.

5. The computer-implemented method of claim 1, wherein the operating data indicates a steering pattern of the vehicle during the current trip, and the method further comprises:
determining, by the processor and based on the historical driving data, a historical steering pattern that has caused activation of the vehicle component;
determining, by the processor, that the steering pattern of the vehicle during the current trip matches the historical steering pattern; and
determining, by the processor, the likelihood value based on the steering pattern of the vehicle during the current trip matching the historical steering pattern.

6. The computer-implemented method of claim 1, wherein the operating data indicates an acceleration pattern of the vehicle during the current trip, and the method further comprises:

determining, by the processor and based on the historical driving data, a historical acceleration pattern that has caused activation of the vehicle component;
determining, by the processor, that the acceleration pattern of the vehicle during the current trip matches the historical acceleration pattern; and
based on the acceleration pattern of the vehicle during the current trip matching the historical acceleration pattern, determining, by the processor, the likelihood value.

7. The computer-implemented method of claim 1, further comprising:
associating, by the processor, the likelihood value with a profile associated with an operator operating the vehicle during the current trip; and
adjusting, by the processor and based on the profile, at least one of a price to risk model, a credit rating, an insurance rating, a permanent credit, or a temporary credit associated with the operator.

8. The computer-implemented method of claim 1, further comprising:
determining, by the processor, that the likelihood value is equal to or greater than a threshold; and
based on the likelihood value being equal to or greater than the threshold, generating, by the processor, the alert to activate the vehicle component.

9. The computer-implemented method of claim 1, further comprising:
switching, by the processor, an operation of the vehicle to be subject to an automated control by the vehicle component.

10. The computer-implemented method of claim 7, further comprising:
transmitting, by the processor, the profile to an entity, wherein receiving the profile causes the entity to:
adjust a review associated with the operator, and
based at least in part on adjusting the review, automatically apply a rental discount to the operator.

11. A computer system for configuring a vehicle component to assist with driving, comprising:
a processor, and
a non-transitory computer-readable memory storing computer-executable instructions that, when executed by the processor, cause the processor to perform operations including:
obtaining, via a sensor and during a current trip of a vehicle, operating data indicating the vehicle component is deactivated;
obtaining historical driving data including historical driving activities performed while the vehicle component was activated;
determining, based on the operating data and the historical driving data, a likelihood value indicative of whether the vehicle component will be activated during the current trip;
generating, based on the likelihood value, an alert to activate the vehicle component; and
transmitting the alert to a computing device associated with the vehicle, the alert causing the computing device to activate the vehicle component.

12. The computer system of claim 11, wherein the historical driving data comprises:
historical driving behaviors of a plurality of operators that caused activation of the vehicle component, and
historical reaction data of the plurality of operators in response to the activation of the vehicle component.

13. The computer system of claim 12, wherein the operations further comprise:

determining that the activation of the vehicle component caused at least one valid alert;
determining, based on the historical reaction data, that the plurality of operators did not respond to the at least one valid alert; and
based on determining that the plurality of operators did not respond to the at least one valid alert, increasing the likelihood value.

14. The computer system of claim 12, wherein the operations further comprise:
determining that the activation of the vehicle component caused at least one false alert;
determining, based on the historical reaction data, that the plurality of operators did not respond to the at least one false alert; and
based on determining that the plurality of operators did not respond to the at least one false alert, decreasing the likelihood value.

15. The computer system of claim 11, wherein the operating data indicates a steering pattern of the vehicle during the current trip, and the operations further comprise:
determining, based on the historical driving data, a historical steering pattern that has caused activation of the vehicle component;
determining that the steering pattern of the vehicle during the current trip matches the historical steering pattern; and
based on the steering pattern of the vehicle during the current trip, matching the historical steering pattern, determining the likelihood value.

16. The computer system of claim 11, wherein the operating data indicates an acceleration pattern of the vehicle during the current trip, and the operations further comprise:
determining, based on the historical driving data, a historical acceleration pattern that has caused activation of the vehicle component;
determining that the acceleration pattern of the vehicle during the current trip matches the historical acceleration pattern; and
based on the acceleration pattern of the vehicle during the current trip matching the historical acceleration pattern, determining the likelihood value.

17. A non-transitory computer-readable memory storing thereon instructions for configuring a vehicle component to assist with driving, that, when executed by a processor, cause the processor to perform operations including:
obtaining, via a sensor and during a current trip of a vehicle, operating data indicating the vehicle component is deactivated;
obtaining historical driving data including historical driving activities performed while the vehicle component was activated;
determining, based on the operating data and the historical driving data, a likelihood value indicative of whether the vehicle component will be activated during the current trip;
generating, based on the likelihood value, an alert to activate the vehicle component; and
transmitting the alert to a computing device associated with the vehicle, the alert causing the computing device to activate the vehicle component.

18. The non-transitory computer-readable memory of claim 17, wherein the historical driving data comprises:
historical driving behaviors of a plurality of operators that caused activation of the vehicle component, and
historical reaction data of the plurality of operators in response to the activation of the vehicle component.

19. The non-transitory computer-readable memory of claim 18, wherein the instructions, when executed by a processor, cause the processor to perform operations including:
determining that the activation of the vehicle component caused at least one valid alert;
determining, based on the historical reaction data, that the plurality of operators did not respond to the at least one valid alert; and
based on determining that the plurality of operators did not respond to the at least one valid alert, increasing the likelihood value.

20. The non-transitory computer-readable memory of claim 18, wherein the instructions, when executed by a processor, cause the processor to perform operations including:
determining that the activation of the vehicle component caused at least one false alert;
determining, based on the historical reaction data, that the plurality of operators did not respond to the at least one false alert; and
based on determining that the plurality of operators did not respond to the at least one false alert, decreasing the likelihood value.

* * * * *